(12) United States Patent
Helland

(10) Patent No.: US 12,189,417 B2
(45) Date of Patent: *Jan. 7, 2025

(54) TIME PROPOSALS IN DIRECTOR-BASED DATABASE SYSTEM FOR TRANSACTIONAL CONSISTENCY

(71) Applicant: salesforce.com, inc., San Francisco, CA (US)

(72) Inventor: Patrick James Helland, San Rafael, CA (US)

(73) Assignee: Salesforce, Inc., San Francisco, CA (US)

( * ) Notice: Subject to any disclaimer, the term of this patent is extended or adjusted under 35 U.S.C. 154(b) by 385 days.

This patent is subject to a terminal disclaimer.

(21) Appl. No.: 17/342,310

(22) Filed: Jun. 8, 2021

(65) Prior Publication Data
US 2022/0391378 A1 Dec. 8, 2022

(51) Int. Cl.
*G06F 1/10* (2006.01)

(52) U.S. Cl.
CPC .................... *G06F 1/10* (2013.01)

(58) Field of Classification Search
CPC ........ G06F 1/10; G06F 16/256; G06F 16/275; G06F 1/14
See application file for complete search history.

(56) References Cited

U.S. PATENT DOCUMENTS

| | | | |
|---|---|---|---|
| 6,301,601 B1 | 10/2001 | Helland et al. | |
| 8,356,007 B2 * | 1/2013 | Larson | G06F 16/1865 707/610 |
| 9,075,841 B2 * | 7/2015 | Larson | G06F 16/27 |
| 9,261,898 B1 | 2/2016 | Allen | |
| 9,984,140 B1 | 5/2018 | Sukumaran et al. | |
| 10,191,959 B1 | 1/2019 | Nguyen et al. | |
| 10,250,693 B2 | 4/2019 | Colrain et al. | |
| 10,298,715 B2 | 5/2019 | Aikoh et al. | |
| 10,324,905 B1 * | 6/2019 | Ross | G06F 16/23 |
| 10,346,386 B2 | 7/2019 | Chatterjee et al. | |
| 10,423,342 B1 * | 9/2019 | Chheda | G06F 3/0685 |

(Continued)

OTHER PUBLICATIONS

Office Action in U.S. Appl. No. 17/342,275 mailed Mar. 2, 2023, 17 pages.

(Continued)

*Primary Examiner* — Angelica Ruiz
(74) *Attorney, Agent, or Firm* — Kowert, Hood, Munyon, Rankin & Goetzel, P.C.; Mark D. Seegers; Dean M. Munyon

(57) ABSTRACT

Techniques are disclosed relating to a database system includes worker nodes operable to perform transactions and director nodes operable to ensure transactional consistency for the transactions. A worker node may receive a request to perform a transaction involving writing a record. The worker node may then issue, to director nodes of the database system, a request for information that facilitates performance of an operation for the transaction. A director node may determine whether to approve the request based on whether the operation could cause transactional inconsistency in the database system. The worker node may proceed to perform the operation for the transaction in response to receiving approval responses from a majority of the director nodes, with none of the received responses indicating a disapproval of the transaction.

18 Claims, 22 Drawing Sheets

(56) References Cited

U.S. PATENT DOCUMENTS

| | | | |
|---|---|---|---|
| 10,572,510 | B2 | 2/2020 | Lee et al. |
| 10,585,873 | B2 | 3/2020 | Lee et al. |
| 10,901,861 | B2 | 1/2021 | Martin et al. |
| 10,936,578 | B2 | 3/2021 | Lee et al. |
| 11,314,675 | B2 | 4/2022 | Geng et al. |
| 11,403,000 | B1 | 8/2022 | Barker, Jr. |
| 11,409,781 | B1 | 8/2022 | Brahmadesam |
| 11,461,347 | B1 | 10/2022 | Das |
| 11,669,518 | B1 * | 6/2023 | Chan ............... G06F 16/2379 707/607 |
| 11,822,535 | B2 | 11/2023 | Helland |
| 11,909,574 | B2 * | 2/2024 | Miedema ............ H04L 41/0893 |
| 12,066,999 | B1 * | 8/2024 | Terry ................. G06F 16/2322 |
| 2010/0103781 | A1 | 4/2010 | Rai et al. |
| 2010/0174802 | A1 | 7/2010 | Chan |
| 2012/0102006 | A1 | 4/2012 | Larson et al. |
| 2013/0159251 | A1 | 6/2013 | Skrenta |
| 2013/0290249 | A1 | 10/2013 | Merriman et al. |
| 2013/0332484 | A1 | 12/2013 | Gajic |
| 2015/0254325 | A1 | 9/2015 | Stringham |
| 2015/0278039 | A1 | 10/2015 | Bogdanov et al. |
| 2015/0295700 | A1 | 10/2015 | Gomez Gutierrez et al. |
| 2015/0317371 | A1 | 11/2015 | Ramamurthi et al. |
| 2015/0378774 | A1 | 12/2015 | Vermeulen |
| 2016/0070771 | A1 | 3/2016 | Vermeulen et al. |
| 2016/0210322 | A1 | 7/2016 | Little |
| 2017/0177697 | A1 * | 6/2017 | Lee ........................ G06F 1/14 |
| 2017/0277562 | A1 * | 9/2017 | Christian ............... G06F 8/457 |
| 2018/0004798 | A1 | 1/2018 | Kimura |
| 2018/0062780 | A1 | 3/2018 | Shimizu et al. |
| 2018/0232308 | A1 | 8/2018 | Kusters |
| 2018/0349430 | A1 | 12/2018 | Lee et al. |
| 2018/0373708 | A1 | 12/2018 | Martin et al. |
| 2019/0156153 | A1 * | 5/2019 | Can ........................ G06F 18/24 |
| 2020/0089523 | A1 | 3/2020 | Cole |
| 2021/0064473 | A1 | 3/2021 | Zhang |
| 2021/0182246 | A1 | 6/2021 | Foque |
| 2022/0147989 | A1 | 5/2022 | Marsh |
| 2022/0391291 | A1 | 12/2022 | Helland |
| 2022/0391376 | A1 | 12/2022 | Helland |
| 2022/0391377 | A1 | 12/2022 | Helland |
| 2022/0391378 | A1 | 12/2022 | Helland |
| 2022/0391379 | A1 | 12/2022 | Helland |

OTHER PUBLICATIONS

International Search Report and Written Opinion in PCT Appl. No. PCT/US2022/072197 mailed Aug. 12, 2022, 12 pages.

International Search Report and Written Opinion in PCT Appl. No. PCT/US2022/072200 mailed Aug. 9, 2022, 14 pages.

Wikipedia, "Blockchain," Jun. 2, 2021 (Jun. 2, 2021), XP055947746, Retrieved from the Internet: URL: https://en.wikipedia.org/w/index.php?title=Blockchain&oldid=1026435765 (retrieved on Aug. 1, 2022] 30 pages.

Office Action in U.S. Appl. No. 17/342,319 mailed Jan. 30, 2023, 20 pages.

Huang et al., "Gray Failure: The Achilles' Heel of Cloud-Scale Systems," HotOS '17, May 8-10, 2017, Association for Computing Machinery; https://www.microsoft.com/en-us/research/wp-content/uploads/2017/06/paper-1.pdf; 6 pages. [Retrieved Jun. 7, 2021].

Gunawi et al., "Fail-Slow at Scale: Evidence of Hardware Performance Faults in Large Production Systems," Proceedings of the 16th USENIX Conference on File and Storage Technologies, Feb. 12-15, 2018; https://www.usenix.org/system/files/conference/fast18/fast18-gunawi.pdf; 15 pages. [Retrieved Jun. 7, 2021].

Office Action in U.S. Appl. No. 17/342,290 mailed May 25, 2023, 7 pages.

Office Action in U.S. Appl. No. 17/342,319 mailed Aug. 10, 2023, 22 pages.

Office Action in U.S. Appl. No. 17/342,300 mailed Aug. 31, 2023, 15 pages.

Office Action in U.S. Appl. No. 17/342,319 mailed Jan. 4, 2024, 22 pages.

Office Action in U.S. Appl. No. 17/342,290 mailed Nov. 21, 2023, 8 pages.

Notice of Allowance in U.S. Appl. No. 17/342,290 mailed Mar. 28, 2024, 8 pages.

Xinan Yan et al., Domino: Using Network Measurements to Reduce State Machine Replication Latency in WANs, Nov. 24, 2020, pp. 351-363, published in CoNEXT '20: Proceedings of the 16th International Conference on Emerging Networking Experiments and Technologies, Barcelona, Spain.

* cited by examiner

TIME PROPOSALS IN DIRECTOR-BASED DATABASE SYSTEM FOR TRANSACTIONAL CONSISTENCY

BACKGROUND

Technical Field

This disclosure relates generally to a database system and more specifically, to handling slowdowns to components of the database system.

Description of the Related Art

Companies routinely employ modern database management systems that enable users to store a collection of information in an organized manner that can be efficiently accessed and manipulated. Historically, those systems have been deployed on high-end, expensive hardware maintained in datacenters owned by those companies. For the most part, the high-end hardware behaves predictably and enables the systems to achieve a fast, responsive latency. But over time, more and more companies have moved their systems into the cloud and thus rely on the hardware that is supplied by the cloud provider. Cloud providers, however, have started to shift towards using cheaper hardware within their cloud infrastructures that behaves less predictably than the higher-end hardware.

DETAILED DESCRIPTION

Figure 1:
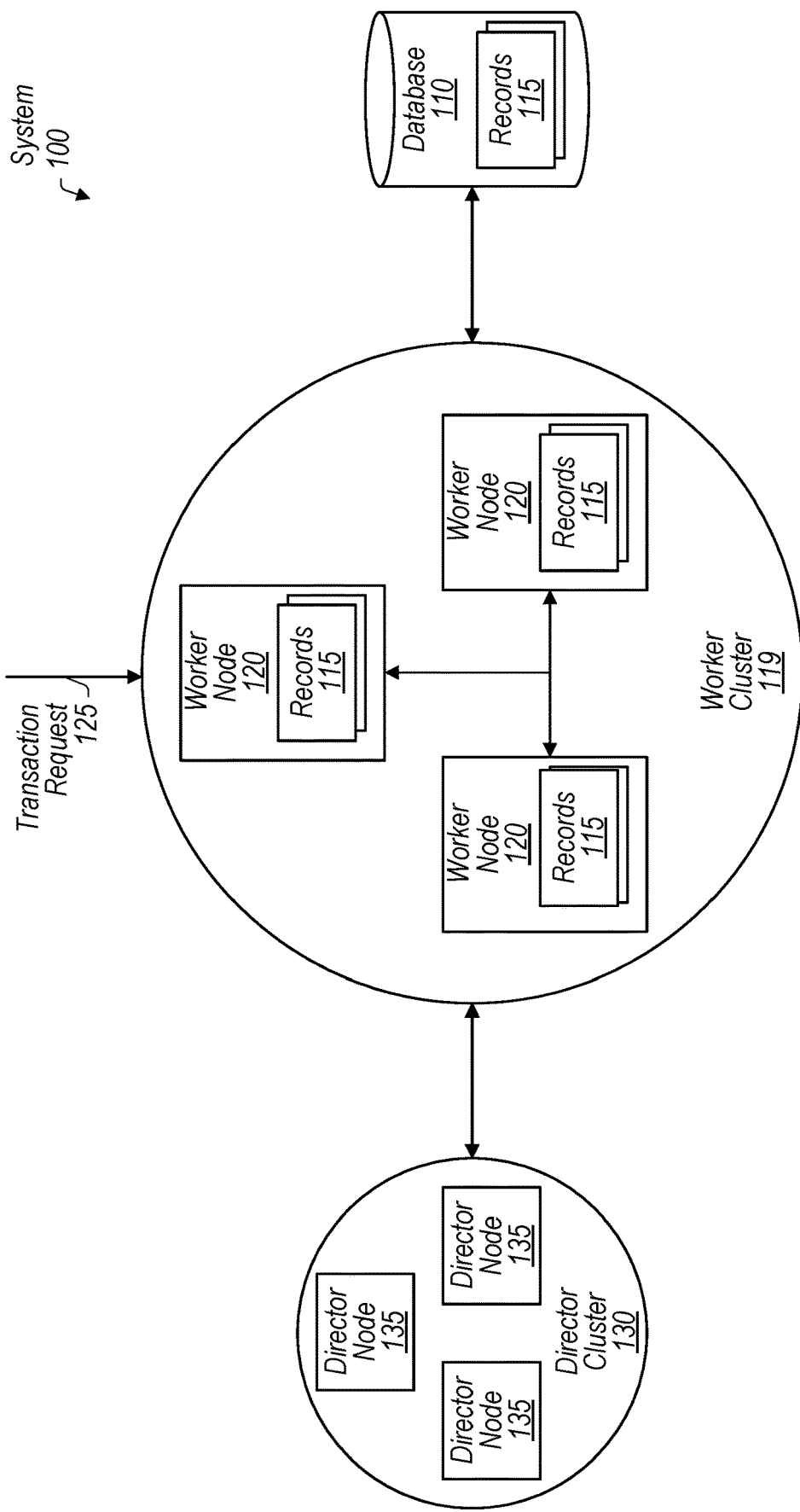
FIG. 1 is a block diagram illustrating example elements of a system that includes worker nodes and director nodes, according to some embodiments.

As explained, cloud providers are shifting towards using cheaper, and therefore less-reliable, hardware in their cloud infrastructures. As a result of using inexpensive hardware, there has been an increase in the number of reports of servers randomly slowing down. This random slowdown of a server (or other component) encompasses both a gray failure (in which a server suddenly experiences a significant drop (e.g., an upwards-of-99%) in its performance) and a straggler (in which a server experiences a less pronounced slowdown, such as a 25% drop in performance). When a slowdown occurs, a server does the "correct" thing but does it slowly enough to avoid failure detectors that would kill the server while also causing problems for the whole system. For example, a server might operate at half its normal speed, but still be able to output work and respond to requests, though slowly, and thus not draw suspicion from the rest of the system despite the server's slower performance.

Slowdowns can affect transactional and non-transactional systems, but the approaches used for handling slowdowns in non-transactional systems are not applicable to transactional systems. A transaction is a set of commands that are logically grouped together as a single unit of work. A transactional system is a type of system that processes transactions according to a set of guiding principles that ensure transactional consistency. ACID (Atomicity, Consistency, Isolation, and Durability) is an example of the guiding principles and it seeks to guarantee that either all of a transaction succeeds or none of it, ensure that data is consistent, guarantee that transactions occur in isolation, and ensure that, once a transaction is committed, it will remain in the system. A non-transactional system is not bound by a set of guiding principles that ensure transactional consistency. One approach to addressing slowdowns in non-transactional systems is to retry portions of the computational work when a time-limit has been reached—that is, the work is retried on another server after a period of time has passed in which the slow server has failed to produce a result. In some cases, the computational work is pushed to multiple servers so that even if one of those servers suffers a slowdown, then the other servers can still return a result of that work. This is an acceptable approach for non-transactional systems because their work is idempotent, meaning that the same work can be carried out multiple times without it causing an unintended state in the system. As an example, fetching and returning a static web page is idempotent work. This stands in contrast to non-idempotent work, such as incrementing a counter, which if retried multiple times can result in the counter being incremented more than intended. Because transactional database systems adhere to principles that ensure transactional consistency, the work of transactional database systems is generally non-idempotent and there is usually a guarantee that transactions appear to be happening only one at a time. As such, the approach of trying the same work on multiple servers is not viable for a transactional database system. The present disclosure addresses, among other things, the problem of how to safeguard a transactional database system against slowdowns that can cause the individual components of that system to slow down.

Slowdowns also cause issues when attempting to scale transactional database systems to have more database nodes (alternatively, "worker" nodes) that perform transactions. As the number of database nodes increases in the system, the chances of transactional inconsistencies increase as well. In one embodiment, a director node is implemented that ensures transactional consistency in a transactional database system by checking for conflicts between transactions performed by the worker nodes. A system that uses one director node, however, is susceptible to appreciably major performance degradation if that director node suffers a slowdown as the transactions are not able to be completed without the consent of the director node. The present disclosure further addresses, among other things, the problem of how to ensure transactional consistency among worker nodes in view of slowdowns occurring in a transactional database system.

This disclosure describes techniques for implementing mechanisms that mitigate some or all of the effects of slowdowns on a system. In various embodiments described below, a system includes a database and a set of "worker" nodes that perform transactions for the system that involve writing records to the database. The system further includes a group of "director" nodes that help ensure to transactional consistency between the transactions that are performed by the worker nodes. Throughout the execution of a transaction, a worker node may interact with the director nodes to ensure that the actions of that worker node to do not interfere with actions of other worker nodes within the system. When interacting with the group of director nodes, the worker node sends a request to a set of the director nodes (e.g., some or all of them) and waits for approval responses from at least a majority of the group of director nodes before proceeding. In some cases, the director nodes check for conflicts between records that are submitted by the worker node and a history of approved records (that is, records approved to be committed) known to an individual director node. An identified conflict can result in a director node sending a disapproval response to the worker node. In other cases, the director nodes check for issues in starting a transaction and may return approval responses that include information about previously approved records up to a particular time. In the event that the worker node does not receive approval responses from a majority of the group of director nodes or receives a disapproval response, the worker node can abort the transaction.

These techniques may be advantageous as they can ensure transactional consistency in a system while migrating the effects of slowdowns on that system. In particular, as discussed in more detail below, the system can be structured such that not all director nodes have to respond, but only a majority in order to ensure transactional consistency. Accordingly, one or more director nodes can unexpectedly slow down as a result of slowdowns without slowing down the progress of transactions of the system. Consider an example in which the system includes a group of three director nodes, with approval responses from at least two director nodes (a majority) together providing a transactional consistency guarantee. A worker node may send a commit request to all three director nodes for permission to commit a transaction. Because the worker node sent requests to three director nodes and only two approval responses are required in this example to ensure transactional consistency, one of the director nodes can suffer a slowdown and slow down while the other two director nodes respond. As a result, the overall system does not slow down because of that slowdown.

This disclosure further describes the use of assistant nodes for mitigating some or all of the effects of slowdowns on worker nodes. In various embodiments, a worker nodes is associated with one or more assistant nodes that observe work that is performed by the worker node. The assistant nodes may follow the worker node's transaction log and store records that match those records that are written at the worker node. During operation, a first worker node (the "reading" node) may communicate with a second worker node (the "writing" node whose work is being observed by an assistant node) to attempt to obtain a record from the second worker node. In some instances, the writing worker node may suffer a slowdown and not be able to provide a response in a timely manner. The reading worker node may then communicate with the writing worker node's assistant node in an attempt to obtain the record. Because the assistant node observes the work of the writing worker node, the assistant node may provide a response on behalf of the writing worker node. The response may include the record. These techniques may be advantageous as they can prevent reading worker nodes from being slowed down (e.g., waiting on a response) by other worker nodes (e.g., writing worker nodes) that suffer slowdowns. This disclosure also discusses concepts pertaining to aligning time among the worker nodes and the director nodes of the system. An example application of the techniques of this disclosure will now be discussed, starting with reference to FIG. 1.

Turning now to FIG. 1, a block diagram of a system 100 is shown. System 100 includes a set of components that may be implemented via hardware or a combination of hardware and software. In the illustrated embodiment, system 100 includes a database 110, a worker cluster 119 having worker nodes 120, and a director cluster 130 having director nodes 135. Also as shown, database 110 and worker nodes 120 include records 115. In some embodiments, system 100 is implemented differently than shown. For example, system 100 may include assistant nodes that observe the work of worker nodes, although in some cases, a worker node may also act as an assistant node to another worker node.

System 100, in various embodiments, implements a platform service (e.g., a customer relationship management (CRM) platform service) that allows users of that service to develop, run, and manage applications. System 100 may be a multi-tenant system that provides various functionality to users/tenants hosted by the multi-tenant system. Accordingly, system 100 may execute software routines from various, different users (e.g., providers and tenants of system 100) as well as provide code, web pages, and other data to users, databases (e.g., database 110), and other entities of system 100. In various embodiments, system 100 is implemented using a cloud infrastructure that is provided by a cloud provider. Database 110, worker nodes 120, and director nodes 135 may thus execute on and utilize the available cloud resources of the cloud infrastructure (e.g., computing resources, storage resources, network resources, etc.) in order to facilitate their operation. As an example, worker nodes 120 may execute within respective virtual environments hosted on server-based hardware included within a datacenter of the cloud provider. But in some embodiments, system 100 is implemented using a local or private infrastructure as opposed to a public cloud.

Database 110, in various embodiments, is a collection of information that is organized in a manner that allows for access, storage, and manipulation of that information. Accordingly, database 110 may include supporting software (e.g., storage nodes) that allow for worker nodes 120 to carry out operations (e.g., accessing, storing, etc.) on the information stored at database 110. In various embodiments, database 110 is implemented using a single or multiple storage devices that are connected together on a network (e.g., a storage attached network (SAN)) and configured to redundantly store information in order to prevent data loss. The storage devices may store data persistently and thus database 110 may serve as a persistent storage for system 100. Information (e.g., records 115) that is written to database 110 by a worker node 120 may be accessible to other worker nodes 120. As discussed in greater detail with respect to FIG. 11, records 115 may be stored in log-structured merge tree (LSM tree) files as part of an LSM tree that is implemented at database 110.

As shown, database 110 stores records 115. A record 115, in various embodiments, is a key-value pair comprising data and a corresponding key that is usable to look up that record 115. As an example, a record 115 may correspond to a data row in a database table and specify values for one or more attributes/fields of that database table. In various embodiments, records 115 are immutable and thus to update the underlying database construct (e.g., a row in a table), a new record 115 is written. Accordingly, a database construct may be associated with multiple records 115, each of which is a different version of that database construct. Those records 115 can be referred to as "record versions" of the database construct. As an example, a first record 115 (a first record version) may initially be written that stores certain values for a database row and later a second record 115 (a second, subsequent record version) may be written that updates one or more of the values of the database row. Those two records 115 may be accessible using the same key.

Worker nodes 120, in various embodiments, provide various database services, such as data storage, data retrieval, and/or data manipulation. In various embodiments, a worker node 120 is a set of software routines executable on hardware, while in some embodiments, a worker node 120 encompasses both the hardware and the software routines. The database services may be provided to other components in system 100 or to components external to system 100. For example, a worker node 120 may receive a transaction request 125 from an application node (not shown) to perform a database transaction. A database transaction, in various embodiments, is a logical unit of work (e.g., a specified set of database operations) to be performed in relation to database 110. For example, processing a database transaction may include executing a SQL SELECT command to select one or more rows from one or more database tables. The contents of a row may be specified in a record 115 and thus a worker node 120 may return one or more records 115 that correspond to the one or more table rows. Performing a database transaction can include a worker node 120 writing one or more records 115 to database 110. The worker node 120, in various embodiments, initially writes the records 115 to a local in-memory cache before flushing them to database 110. Before committing those records 115 and flushing them, the worker node 120 may communicate with director nodes 135 to ensure that the records 115 do not conflict with record writes performed by other worker nodes 120. As used herein, the phrase "committing a transaction" (which includes committing a record) is used in accordance with its well-understood meaning and refers to the process of causing changes made during the transaction to be saved and made visible outside of the entity performing the transaction. The worker node 120 may also communicate with director nodes 135 when starting a transaction in order to obtain information about the state of records stored within system 100 (e.g., a history of records 115 that have potentially been committed by other worker nodes 120 but not flushed to be available at database 110). Various components of a worker node 120 are discussed in detail with respect to FIG. 2.

Director nodes 135, in various embodiments, facilitate the performance of transactions and help ensure transactional consistency for those transactions. In various embodiments, a director node 135 is a set of software routines executable on hardware, while in some embodiments, a director node 135 encompasses the hardware and the software routines. As illustrated, director nodes 135 form a director cluster 130. The number of director nodes 135 within director cluster 130 may vary between different embodiments. For example, director cluster 130 may include three director nodes 135, five director nodes 135, eight director nodes 135, etc. While director nodes 135 are a part of director cluster 130, in various embodiments, director nodes 135 do not communicate with each other. In particular, when a worker node 120 sends a request to two or more director nodes 135, those director nodes 135 may not communicate information between each other that pertains to the request. Accordingly, a director node 135 may process a request from its own knowledge and perspective independent of the knowledge and perspectives of the other director nodes 135. But in some embodiments, director nodes 135 communicate with each other to share certain pieces of information (e.g., a respective history of approved records) that can be used to complete a request. Various components of a director node 135 are discussed in detail with respect to FIGS. 3 and 4.

In order to process requests from worker nodes 120, in various embodiments, a director node 135 maintains information about the state of records 115 stored within worker nodes 120. When starting a transaction, a worker node 120 may send a snapshot request to a set of director nodes 120 to obtain a snapshot time. In various embodiments, a snapshot time identifies the state of system 100 at a certain point in time and can be used by the owner (e.g., a transaction) of the snapshot time to access records available at that point in time. The concept of a snapshot time is discussed in more detail with respect to FIG. 2. Accordingly, a director node 135 may approve a snapshot time and then return a response to the worker node 120. In many cases, the response includes the information about the state of records 115 so that the worker node 120 can locate and access records 115 that may be pertinent to the processing of the transaction. The history information from a director node 135, however, may be an incomplete history of approved records. As a result, in some cases, the worker node 120 has to obtain responses from a majority of director cluster 130 in order to obtain the complete history. An example layout of history information on director nodes 135 and a discussion of the snapshot request process are provided in greater detail with respect to FIGS. 5 and 6.

When wishing to commit a transaction, a worker node 120 may send a commit request to a set of director nodes 135 to obtain approval for the commit. When determining whether to approve the request, a director node 135 may utilize its history information to determine if the requested action(s) (e.g., permission to commit) will result in an inconsistent or undesired state in system 100. If there will be a conflict, then the director node 135 denies the request, causing the worker node 120 to abort a portion or all of the database transaction. If there is no conflict from the director node's perspective, then the director node 135 approves the request and may update its history information about the state of records 115 to reflect the approval. An example update of history information and a discussion of the commit request process are provided in greater detail with respect to FIGS. 7 and 8.

Figure 2:
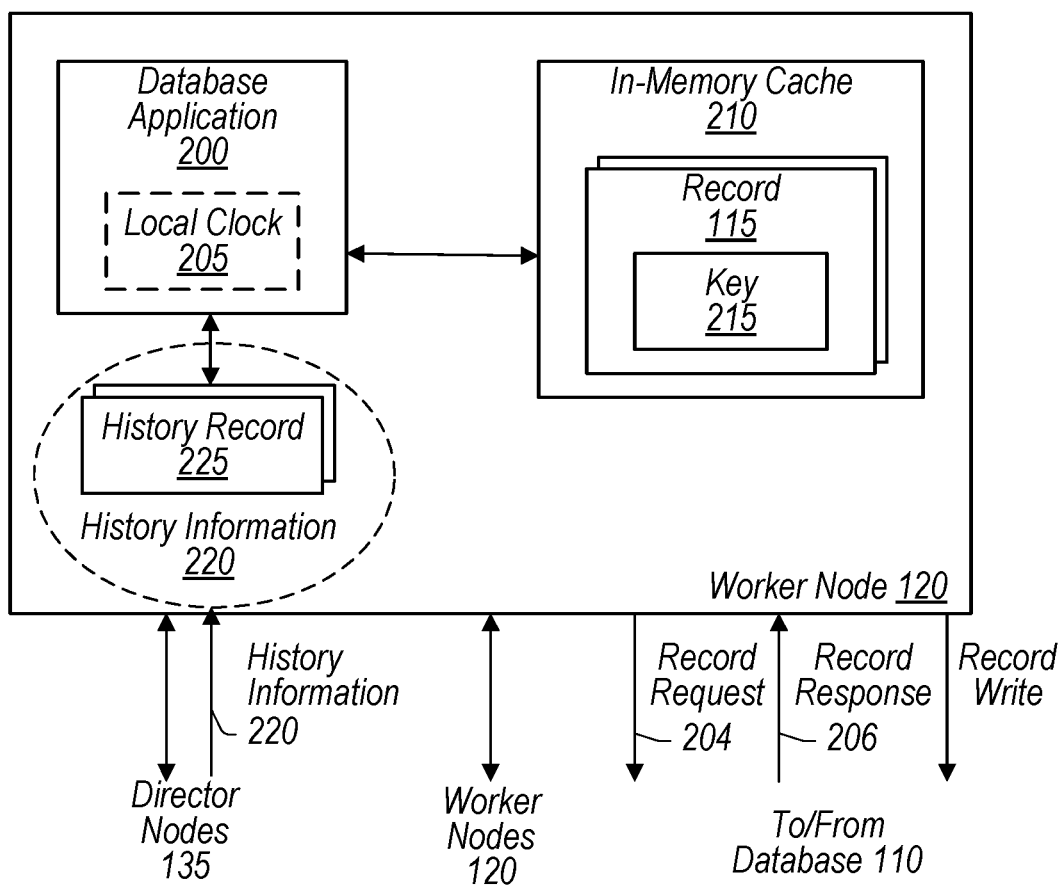
FIG. 2 is a block diagram illustrating example elements of a worker node, according to some embodiments.

Turning now to FIG. 2, a block diagram of example elements of a worker node 120 is shown. In the illustrated embodiment, worker node 120 includes a database application 200, an in-memory cache 210, and history information 220. As further shown, database application 200 maintains a local clock 205; in-memory cache 210 stores records 115 associated with keys 215; and history information 220 includes a set of history records 225. In some embodiments, worker node 120 is implemented differently than shown. For example, worker node 120 may store a transaction log having log records. Although, in some embodiments, the transaction log is stored at storage shared among worker nodes 120 as discussed with respect to FIG. 10.

Database application 200, in various embodiments, is a set of program instructions that are executable to manage database 110, which may include managing an LSM tree built around database 110. Accordingly, database application 200 may receive requests to perform database transactions that involve reading and/or writing records 115 for system 100. Upon receiving a transaction request, database application 200 may initiate a database transaction based on that request, including obtaining a snapshot time for that database transaction. A snapshot time, in various embodiments, is a value that indicates which records 115 can be read by worker node 120. The value may be a time (e.g., a time window that covers a millisecond) or a numerical value indicative of a time period. That is, system 100 may increment an integer commit value over time and a snapshot time may correspond to one of the values of that commit value. Records 115 having a commit value less than (or equal to, in various cases) the snapshot time may be read by worker node 120. For example, a transaction may be assigned a snapshot time of "445" (or a time of "10:11:20"). As a result, database application 220 may read, for that transaction, records 115 having a commit value less than or equal to 445 (or 10:11:20). As discussed further below, a worker node 120 can communicate with director nodes 135 to obtain an approval of a snapshot time for a transaction.

Local clock 205, in various embodiments, identifies the local time observed by worker node 120. In some cases, local clock 205 is provided by an operating system that is executing on worker node 120; in some cases, database application 200 maintains its own local clock 205 independent of how other applications executing on worker node 120 observe time. In various embodiments, database application 200 performs certain database operations based on the time of local clock 205. For example, as discussed further below, database application 200 may use clock 205 to select and propose a snapshot time (or a commit time, both of which are discussed in more detail below) to director nodes 135 for approval. In various embodiments, worker nodes 120 and director nodes 135 each have their own opinion of the current time within system 100 that is based on their local clock 205. The local clocks 205 of worker nodes 120 and director nodes 135, however, might become out of sync with each other over time—that is, their local clocks 205 may identify different times. As a result, a node may observe a time that is appreciably different than the other nodes of system 100. This may cause undesired effects in which a node (e.g., a director node 135) processes a request appreciably later than other nodes (e.g., other director nodes 135). As discussed in more detail with respect to FIG. 9, the nodes of system 100 may attempt to gradually align their times so that those nodes do not become too far out of sync.

In-memory cache 210, in various embodiments, is a buffer that stores data in memory (e.g., a random access memory) of worker node 120. HBase™ memstore is an example of an in-memory cache 210. After obtaining sufficient approval for a snapshot time for a transaction, worker node 120 may begin reading and writing records 115 to process the transaction. Worker node 120, in various embodiments, initially writes a record 115 into its in-memory cache 210 and later flushes that record 115 to database 110 after it has been committed by worker node 120. In various cases, the latest/newest record version of a row in a database table is found in a record 115 that is stored in in-memory cache 210. Records 115, however, that are written to worker node 120's in-memory cache 210 are not visible to the other worker nodes 120, in some embodiments. That is, the other worker nodes 120 do not know, without asking or being told, what information is stored within in-memory cache 210. Accordingly, in various embodiments, worker node 120 obtains history information 220 from director nodes 135 that identifies where a certain record 115 (e.g., the latest record version of a database row) may potentially be found. As such, worker node 120 may use history information 220 to identify what records 115 are stored within the in-memory caches 130 of other worker nodes 120.

History information 220, in various embodiments, includes a collection of history records 225. A history record 225, in various embodiments, includes information that identifies, for a key 215 usable to look up a record 115 corresponding to that history record 225, a location of that record 115 in system 100. In various embodiments, history information 220 captures different records (with different keys) and different versions of the same database construct (e.g., a data row) identified with the same key. Accordingly, history information 220 may include multiple history records 225 for multiple versions of the same database construct, committed by different transactions at different times with the same key 215. When looking for a certain record version of a database construct (e.g., the latest record 115 of a database row), worker node 120 may identify a set of history records 225 based on a key 215 that corresponds to the database construct. Worker node 120 may thereafter identify, from timestamps, which history record 225 corresponds to the record version and then may use that history record 225 in order to attempt to access the record 115. In some embodiments, a single history record 225 may store the locations of multiple records 115 of the same key 215.

When attempting to access a record 115 from a location external to worker node 120, in various embodiments, worker node 120 sends a record request 204 to the location. As shown for example, worker node 120 sends a record request 204 to database 110. Record request 204 may specify a key 215 corresponding to a record 115 that can be used by the receiver to attempt to locate that record 115. Thereafter, worker node 120 may receive a record response 206. In some cases, the record response 206 includes the requested record 115. But in some cases, the record response 206 does not include the requested record 115 even though a history record 225 indicated that the record 115 was at that location. For example, a director node 135 may create a history record 225 that indicates that a record 115 may have been committed at a worker node 120. After being granted permission to commit the transaction associated with that record 115, that worker node 120 may, however, abort the transaction and delete the record 115. Consequently, upon receiving a record request 204 for the record 115, that worker node 120 returns a record response 206 that indicates that that worker node 120 did not write a record 115 at a time specified in the received record request 204.

After processing a transaction (e.g., after writing all the requested records 115 for that transaction), in various embodiments, worker node 120 sends a commit request to a majority of the director nodes 135 of director cluster 130. The commit request may include the records 115 written for the transaction so that the director nodes 135 can check for record conflicts. In response to receiving approval from a majority of the director nodes 135 with no disapprovals, worker node 120 may commit the records 115. In some embodiments, disapprovals are allowed as long as a majority of director cluster 130 approves of the commit request. As part of the commit, in various embodiments, worker node 120 stamps each record 115 with a value (e.g., a time, a numerical value indicative of a time period, etc.) indicative of when the record 115 was committed. The committed records 115 may remain in in-memory cache 210 until a triggering event (e.g., in-memory cache 210 is close to being full or is full) causes those records 115 to be flushed to database 110. Records 115 stored in in-memory cache 210 may be accessible to and used in other transactions whose snapshot time/value is greater than the commit time/value of the records 115 being accessed.

Figure 3:
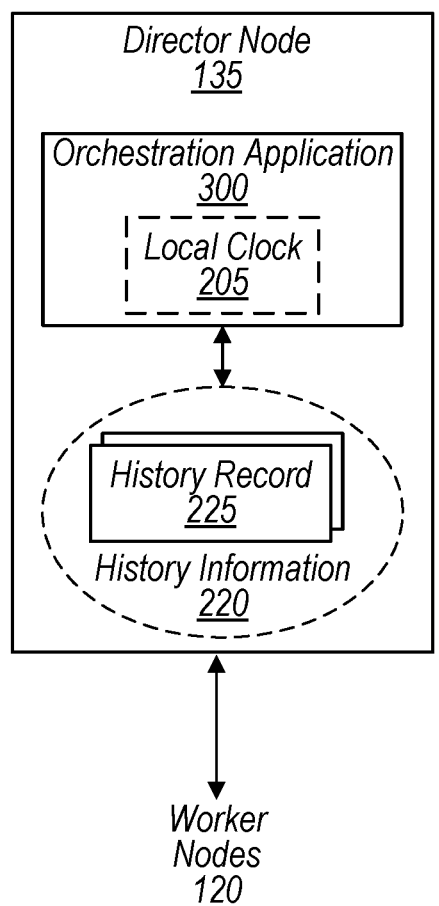
FIG. 3 is a block diagram illustrating example elements of a director node, according to some embodiments.

Turning now to FIG. 3, a block diagram of example elements of a director node 135 is shown. In the illustrated embodiment, director node 135 includes an orchestration application 300 and history information 220. As further shown, orchestration application 300 maintains a local clock 205 and history information 220 includes history records 225. In some embodiments, director node 135 is implemented differently than shown. For example, director node 135 may interface with other director nodes 135 of director cluster 130.

Orchestration application 300, in various embodiments, is a set of program instructions executable to facilitate the performance of transactions and to ensure transactional consistency for those transactions. To facilitate the performance of a transaction, in various embodiments, orchestration application 300 provides a portion or all of its history information 220 to a worker node 120 to enable that worker node 120 to know about work performed by other worker nodes 120. As discussed, in various embodiments, committing a record 115 involves communicating with the director nodes 135 to obtain an approval to commit the record 115. Because a director node 135 that approves a commit is aware of that record 115 potentially being committed, its orchestration application 300 is able to store an indication of that approval as a part of history information 220. In some cases, orchestration application 300 may miss a commit request (or otherwise fail to process the request) and thus it might not store a complete history of all recent records 115 that have been approved for commitment by director cluster 130. As a result, in various embodiments, history information 220 identifies only those records 115 that have been approved by its orchestration application 300 for commitment.

Because orchestration application 300 track records 115 that have been approved for commitment, orchestration application 300 may facilitate the performance of a transaction by enabling a worker node 120 to potentially locate records 115 that are pertinent to performing its transaction, including records 115 that are stored within in-memory caches 210. Also, since orchestration application 300 tracks records 115 approved at its director node 135, in various embodiments, it can help ensure transactional consistency among transactions be ensuring that request-for-approval records 115 do not conflict with the approved records 115 identified in its director node's history information 220. Accordingly, upon receiving a commit request for a record 115, orchestration application 300 may determine whether another record 115 having the same key 215 (that is, associated with the same database reconstruct) was already approved within a certain timeframe. In various cases, the timeframe corresponds to the time between a worker node's snapshot time for a transaction and the current time observed by a director node 135. If there is a conflicting approved record 115, then orchestration application 300 can return a disapproval response to the requesting worker node 120, causing the requested record 115 to not be committed and transactional consistency to be ensured. If there is no conflicting record 115, then orchestration application 300 may return an approval response and add a history record 225 to history information 220 that corresponds to the new approved record 115. Note that, in some cases, it is possible for a director node 135 to detect a conflict with an earlier transaction when, in fact, that earlier transaction was not approved by a majority of the director nodes 135. In this case, if enough of the other director nodes 135 do approve this transaction, then the transaction may commit and the conflict perceived at that director node 135 was not a true conflict.

As illustrated, orchestration application 300 maintains a local clock 205 that identifies a current time observed at director node 135 (or at least observed by orchestration application 300, which may be independent of times observed by other applications executing on director node 135). Similar to worker nodes 120, director nodes 135 may perform certain operations at designated times according their respective local clocks 205. As an example, a commit request may be processed at a commit time proposed in the commit request. As mentioned, clocks 205 of director nodes 135 and worker nodes 120 can become out of sync and thus a director node 135 may process a request at a logical time substantially later than another director node 135. Thus, the nodes of system 100 may attempt to gradually align their times so that they do not become too out of sync, which is discussed in more detail with respect to FIG. 9.

Figure 4:
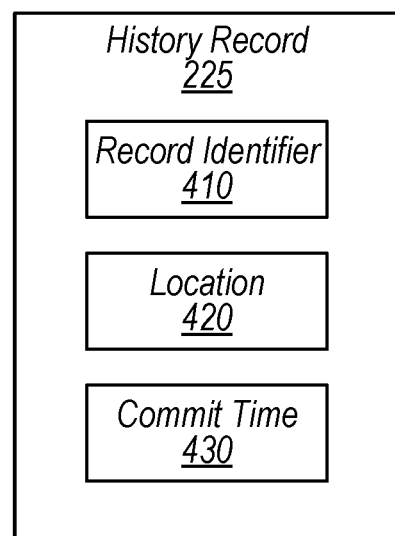
FIG. 4 is a block diagram illustrating example elements of a history record data structure, according to some embodiments.

Turning now to FIG. 4, a block diagram of an example history record 225 is shown. In the illustrated embodiment, history record 225 specifies a record identifier 410, a location 420, and a commit time/epoch 430. In some embodiments, a history record 225 is implemented differently than shown. As an example, a history record 225 may specify a director identifier of the director node 135 that wrote that history record 225.

Record identifier 410, in various embodiments, is information identifying the record(s) 115 that correspond to history record 225. In various cases, record identifier 410 is a key 215 that is usable to look up the corresponding record(s) 115. Record identifiers 410 may be specified in a commit request sent from a worker node 120 to a director node 135 for approval to commit a corresponding set of records 115. In response to deciding to approve the commit request, the director node 135 may generate, for each record 115 in that set, a history record 225 whose record identifier 410 corresponds to that record and is obtained from the commit request.

Location 420, in various embodiments, identifies the location in system 100 of a record 115 that corresponds to history record 225. For example, location 420 may specify a worker node 120 or database 110. In various cases, location 420 initially identifies the worker node 120 that obtained permission to commit the corresponding record 115. If that record 115 is committed and flushed to database 110, then location 420 may be updated by the director node 135 (which created the corresponding history record 225) to identify the location in database 110 where that record 115 is stored. Thus, over time, location 420 may be adjusted as the corresponding record 115 is moved within system 100.

Commit time 430, in various embodiments, identifies a logical time (or time window) at which the associated record 115 is identified as being committed. In various embodiments, a worker node 120 may commit records 115 of a transaction with commit time 430 or it may choose to not commit; however, the worker node 120 may not commit the transaction at any other commit time 430 without re-requesting approval at the new commit time 430. In some cases, the record 115 is actually committed at a physical time that is later than the logical time of commit time 430. In particular, a commit request may specify a proposed commit time. A director node 135 may process the request at the proposed commit time and, if the request is approved, may generate history records 225 whose commit time 430 is the proposed commit time. The requesting worker node 120 may receive an approval response and may commit (if it choose to) the records 115 of that commit request with the proposed commit time 430.

Figure 5:
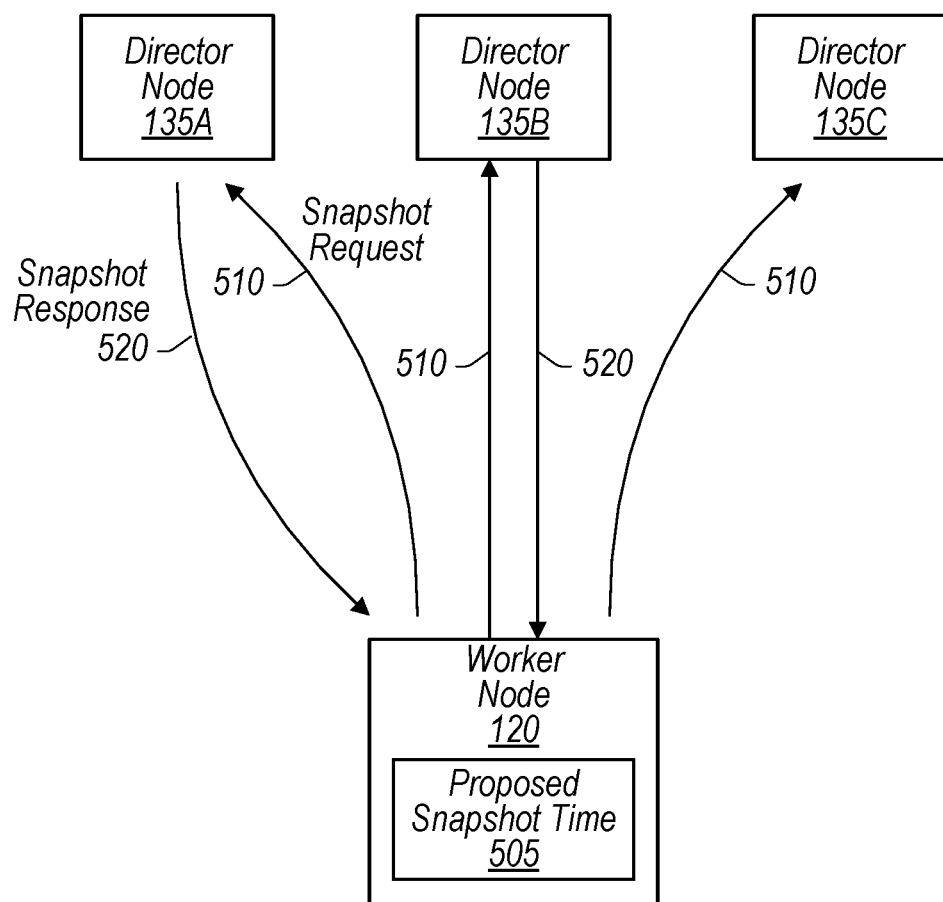
FIG. 5 is a block diagram illustrating example elements of a snapshot-related interaction that involves a worker node and multiple director nodes, according to some embodiments.

Turning now to FIG. 5, a block diagram of an example snapshot-related interaction that involves a worker node 120 and three director nodes 135A-C is shown. In some embodiments, there may be more director nodes 135 than illustrated (e.g., five director nodes 135) and worker node 120 may issue snapshot requests 510 to less than all director nodes 135 (e.g., four out of five) within director cluster 130.

As mentioned, a worker node 120 may receive a request to perform a transaction that can include reading and writing records 115. The request may be received from an application node that is not shown. As a part of processing a transaction, in various embodiments, a worker node 120 obtains, for that transaction, a snapshot time that corresponds to the state of system 100 at a particular point in time. Records 115 committed prior to the snapshot time may be accessed by that worker node 120 for the transaction and when committing the transaction, the snapshot time may serve as a reference point for checking for record conflicts.

To ensure that a transaction is assigned a single snapshot time, in various embodiments, a worker node 120 selects a proposed snapshot time 505 instead of director nodes 135. A worker node 120 may select the snapshot time instead of director nodes 135 as director nodes 135 may not communicate with each other or at least not communicate snapshot information, in various embodiments. Since director nodes 135 may not communicate with each other in various embodiments, situations might arise in which a director node 135 selects a different snapshot time than another director node 135. Thus, the transaction could be associated with multiple snapshot times, which may break transactional guarantees. But in some embodiments, director nodes 135 may assign a snapshot time 505 to a transaction that corresponds to a time at which a snapshot request 510 from a worker node 120 was seen by director cluster 130.

As mentioned, a director node 135 may process a received request at a designated time. Consequently, when selecting a proposed snapshot time 505, in various embodiments, a worker node 120 selects the proposed snapshot time 505 to be such that the corresponding snapshot request 510 is estimated to arrive at director nodes 135 before the proposed snapshot time 505 according to respective local clocks 205 of the director nodes 135. If that snapshot request 510 arrives early at a director node 135, then the director node 135 may store the request and delay processing it until the proposed snapshot time 505 that is identified in the snapshot request 510 is reached according to the local clock 205 of that director node 135. In various cases, director nodes 135 process a received request at the same local time but at different times from a global perspective. If a snapshot request 510 arrives at a director node 135 after the proposed snapshot time 505, then that director node 135 may issue a snapshot response 520 that indicates that the proposed snapshot time 505 has been rejected. In some embodiments, a worker node 120 sends a snapshot request 510 to director nodes 135 and allows them to select a snapshot time 505 for the corresponding transaction.

In some embodiments, in response to receiving a rejection to a proposed snapshot time 505, a worker node 120 selects another proposed snapshot time 505 that is farther from a current time of the worker node 120 than the rejected snapshot time 505 was from the time at which it was selected by the worker node 120. As discussed in more detail with respect to FIG. 9, a worker node 120 may track delays in communicating with director nodes 135 and use those delays to adjust how far in the future a proposed snapshot time 505 is selected to be. In some embodiments, in response to receiving a rejection to a proposed snapshot time 505, but also receiving approvals from at least a majority of the director nodes 135 of cluster 130, a worker node 120 proceeds to perform the transaction in view of the proposed snapshot time 505. Accordingly, in some cases, if a particular director node 135 is reasonably behind other director nodes 135 in time, a worker node 120 may select the proposed snapshot time 505 to be such that the corresponding snapshot request 510 is estimated to arrive at the other director nodes 135 before that proposed snapshot time 505 even if it is estimated to arrive at the particular director node 135 after the proposed snapshot time 505. Thus, when selecting a proposed snapshot time 505, a worker node 120 may consider the tradeoff between reaching more director nodes 135 (which increases the chances of receiving responses from a majority) and selecting a proposed snapshot time 505 that is not too far in the future (which can cause the transaction to be delayed).

In response to receiving a snapshot request 510 with a proposed snapshot time 505, in various embodiments, a director node 135 determines whether to reject the proposed snapshot time 505. If the proposed snapshot time 505 is after a current time at the director node 135 or causes a conflict with other transactions, then that director node 135 may reject it. In response to approving the proposed snapshot time 505, in various embodiments, the director node 135 returns a snapshot response 520 having the director node's history information 220 up to the proposed snapshot time 505. As illustrated, worker node 120 receives snapshot responses 520 from director nodes 135A-B, but not from director node 135C. Assuming that director cluster 130 includes only director nodes 135A-C and the received snapshot responses 520 approve of the proposed snapshot time 505, then worker node 120 may proceed to process the transaction as approval has been received from a majority of director cluster 130 without a disapproval.

Figure 6:
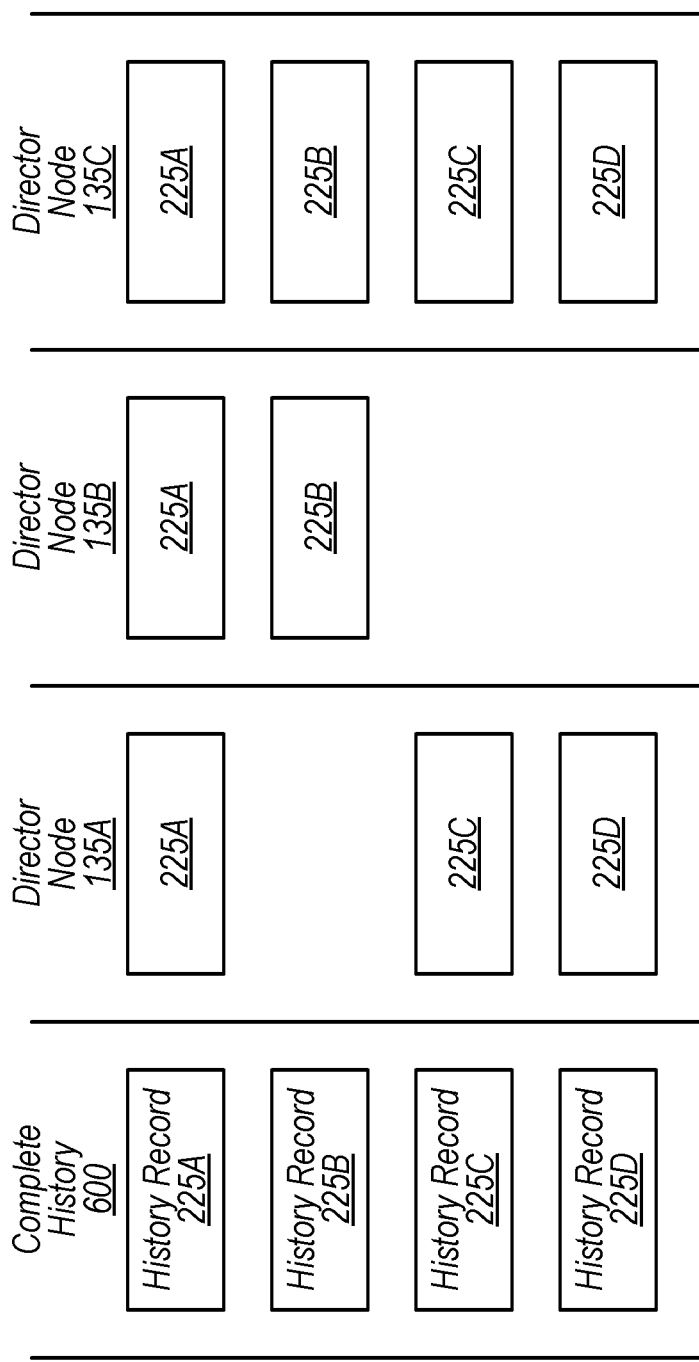
FIG. 6 is a block diagram illustrating an example layout of history information on different director nodes, according to some embodiments.

Turning now to FIG. 6, a block diagram of an example layout of history information on director nodes 135A-C is shown. In the illustrated embodiment, there is a complete history 600 that includes four history records 225A-D. As shown, director node 135A includes history records 225A and 225C-D; director node 135B includes history records 225A-B; and director node 135C includes history records 225A-D. In some cases, complete history 600 may include more or less history records 225 than shown and the layout of history information on director nodes 135 may be different.

In FIG. 5, worker node 120 receives snapshot responses 520 from director nodes 135A-B, but not from director node 135C. As explained, a snapshot response 520 may include history information 220 comprising history records 225 up to a proposed snapshot time 505. Assuming that the proposed snapshot time 505 is after the commit time 430 of history record 225D, worker node 120 receives history records 225A and 225C-D from director node 135A and history records 225A-B from director node 135B, in this example. Since, in various embodiments, a majority of director nodes 135 have to approve a commit and thus have history records 225 for approved records 115, worker node 120 is guaranteed to obtain complete history 600 if worker node 120 receives approvals from a majority of director nodes 135. Continuing with the example, worker node 120 obtains complete history 600 from director nodes 135A-B (which is a majority in the example) even though neither of them stores complete history 600. To obtain complete history 600, worker node 120 may union the received history records 225 from director nodes 135A-B. If worker node 120 receives snapshot responses 520 from less than a majority of director nodes 135, then there is not guarantee that worker node 120 will obtain complete history 600. As an example, if worker node 120 receives a snapshot response 520 from only director node 135B, then worker node 120 obtains less than complete history 600.

Figure 7:
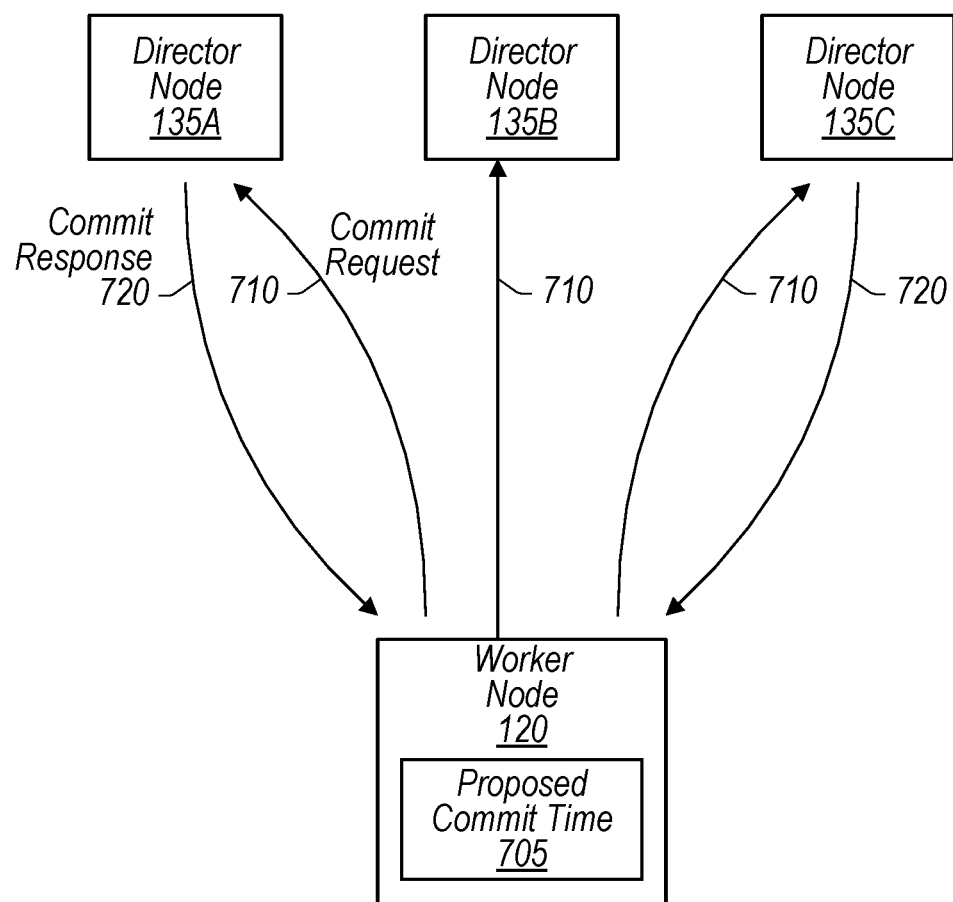
FIG. 7 is a block diagram illustrating example elements of a commit-related interaction that involves a worker node and multiple director nodes, according to some embodiments.

Turning now to FIG. 7, a block diagram of an example commit-related interaction that involves a worker node 120 and three director nodes 135A-C is shown. In some embodiments, there may be more director nodes 135 than illustrated (e.g., five director nodes 135) and worker node 120 may issue commit requests 710 to less than all director nodes 135 (e.g., four out of five) within director cluster 130.

After processing a transaction, a worker node 120 may decide to commit the transaction, including one or more records 115 written for that transaction to the worker node's in-memory cache 210. In order to ensure that the records 115 do not conflict with records 115 written by other worker nodes 120, the worker node 120 issues a commit request 710 to at least a majority of director nodes 135. As shown, worker node 120 issues a commit request 710 to director nodes 135A-C, which is all director nodes 135 in the illustrated embodiment. A commit request 710, in various embodiments, identifies the records 115 (e.g., via record identifiers 410) written for a transaction, a proposed commit time 705 to be applied to those records 115, and the snapshot time approved for the transaction. Similar to a proposed snapshot time 505, a proposed commit time 705 may identify a time (or time window) or a numerical value indicative of a time period.

As with selecting a snapshot time, a worker node 120 may select the commit time instead of director nodes 135 as director nodes 135 may not communicate with each other or at least not communicate about a commit, in various embodiments. When selecting a proposed commit time 705, in various embodiments, a worker node 120 selects the proposed commit time 705 to be such that the corresponding commit request 710 is estimated to arrive at director nodes 135 before the proposed commit time 705 according to respective local clocks 205 of the director nodes 135. Similar to a snapshot request 510, if a commit request 710 arrives early at a director node 135, then the director node 135 may store that request and delay processing it until the proposed commit time 705 that is identified in the commit request 710 is reached according to the local clock 205 of that director node 135. If a commit request 710 arrives after the proposed commit time 705, then the director node 135 may issue a commit response 720 that indicates that the commit request 710 has been rejected. As discussed in regards to a proposed snapshot time 505, in various embodiments, a worker node 120 may also adjust how far in the future that a proposed commit time 705 is selected to be. For example, in response to receiving a rejection to a commit request 710 based on its proposed commit time 705, a worker node 120 may select another proposed commit time 705 that is farther from a current time of that worker node 120 than the rejected commit time 705 was from the time at which it was selected.

In response to receiving a commit request 710, in various embodiments, a director node 135 determines whether to reject the commit request 710. As a part of determining whether to reject the commit request 710, the director node 135 may determine whether any of the records 115 identified in the request conflict with records 115 previously approved for commit by that director node 135. Because, in various embodiments, a director node 135 records approved records 115 in the form of history records 225, the director node 135 can consult the history records 225 in its history information 220. In various embodiments, a first record 115 conflicts with a second record 115 if they are associated with the same record identifier and the second record 115 is identified as being committed after the snapshot time associated with the transaction of the first record 115. Accordingly, a director node 135 may search its history records 225 for one whose record identifier 410 matches the record identifier of a record 115 that is being consider for approval. If a history record 225 is found, the director node 135 may then determine whether its commit time 430 occurs after the snapshot time specified in the commit request 710. If there exists a conflicting record 115, then the director node 135 sends a disapproval commit response 720 to worker node 120 that indicates that there is a record conflict. If there is no conflicting record 115, then that director node 135 sends an approval commit response 720. The director node 135 may also create history records 225 for the records 115 of the approved transaction.

As shown, worker node 120 receives commit responses 720 from director nodes 135A and 135C, but not from director node 135B. Assuming that director cluster 130 includes only director nodes 135A-C and the received commit responses 720 approve of the commit, then worker node 120 may proceed to commit the transaction as approval has been received from a majority of director cluster 130 without a disapproval. In response to receiving a disapproval of a proposed commit time 705, worker node 120 may select a new proposed commit time 705 and send commit requests 710 to director nodes 135A-C with that proposed commit time 705, or the worker node 120 may abort the transaction. In response to receiving a commit response 720 that disapproves of the commit because of one or more record conflicts, worker node 120 may or may not abort the transaction even if worker node 120 receives approval from a majority of director cluster 130. In some embodiments, a director node 135 that approves of a commit records (e.g., via history records 225) that the commit occurred even if the transaction is aborted by the worker node 120.

Figure 8:
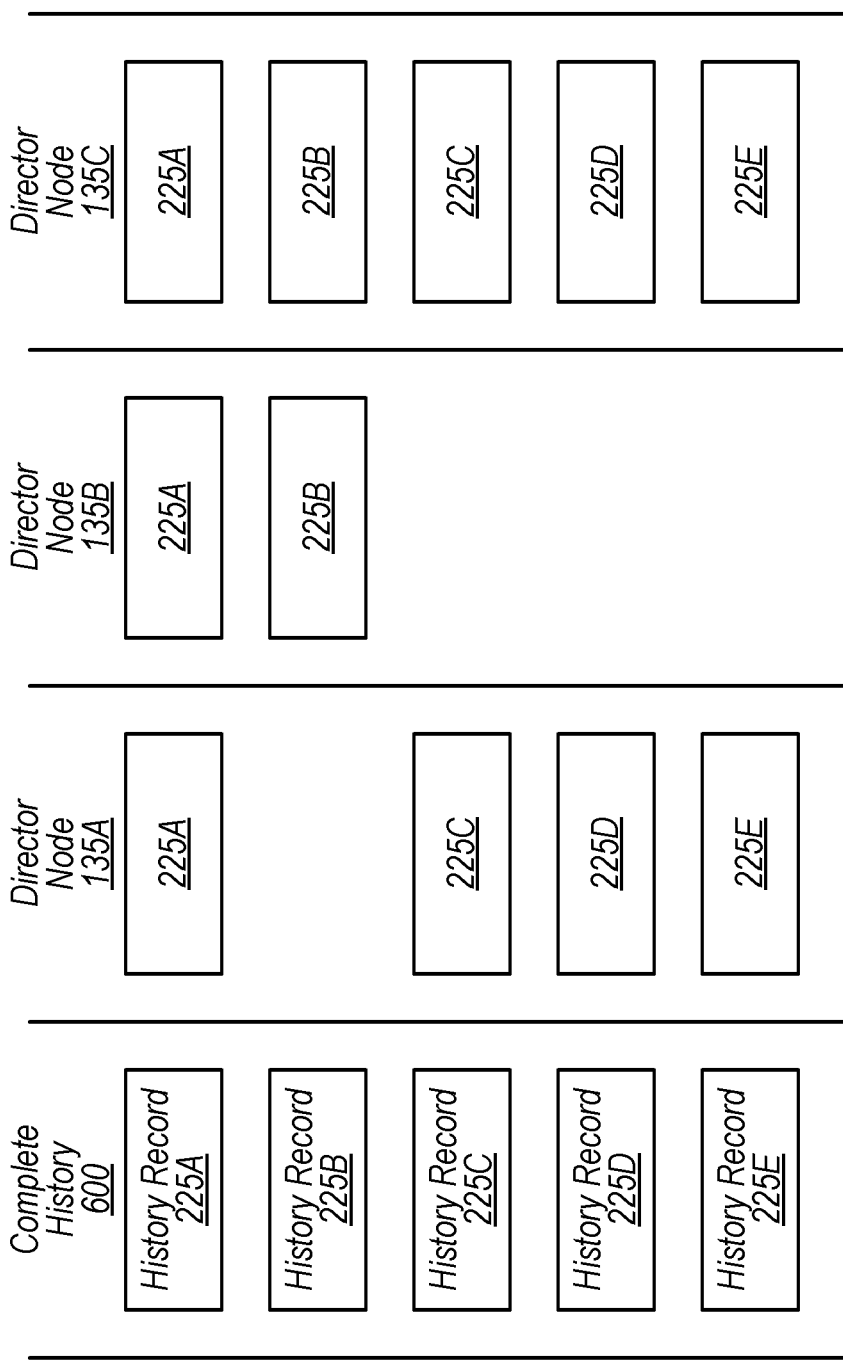
FIG. 8 is a block diagram illustrating another example layout of history information on different director nodes, according to some embodiments.

Turning now to FIG. 8, a block diagram of an example layout of history information on director nodes 135A-C is shown. In the illustrated embodiment, there is a complete history 600 that includes five history records 225A-E. As shown, director node 135A includes history records 225A and 225C-E; director node 135B includes history records 225A-B; and director node 135C includes history records 225A-E. In some cases, complete history 600 may include more or less history records 225 than shown and the layout of history information on director nodes 135 may be different.

To facilitate the following discussion, it is assumed that the example layout of history information shown in FIG. 6 occurs before the example commit-related interaction between a worker node 120 and three director nodes 135A-C shown in FIG. 7. And that the example layout of history information shown in FIG. 8 occurs after the example commit-related interaction. As mentioned, in various embodiments, when a director node 135 decides to approve of a commit, the director node 135 stores history records 225 identifying the records 115 to be committed and where they are assumed to be committed. In FIG. 7, the illustrated worker node 120 receives commit responses 720 from director nodes 135A and 135C, but not from director node 135B. Assuming that a transaction involving a particular record 115 is approved to commit, director nodes 135A and 135C individually store a history record 225E for that particular record 115, in this example. Director node 135B, however, does not store a history record 225E because it may be experiencing a slowdown and thus may not be able to process the commit request 710 that it had received in FIG. 7. As a result, the history of approved records known to one director node 135 can be different than the history of approved records known to another director node 135. Since the transaction was approved by a majority and thus history record 225E was stored on a majority of director nodes 135, worker nodes 120 that receive approval from a majority of director nodes for a snapshot request 510 will receive history record 225E, making them aware of the particular record 115.

In various embodiments, a director node 135 removes history records 225 from its history information 220 over time. In various cases, a new record version of a database construct (e.g., a database row) is approved for commitment that replaces a previous record version. As such, the director node 135 may replace the history record 225 of the previous record version with a new history record 225 of the new record version. In some cases, the director node 135 removes a history record 225 in response to a record 115 aging past a certain threshold. For example, the record 115 associated with history record 225A may be written out to an LSM tree of database 110 and merged down the levels of the LSM tree over time. After that record 115 has reached a certain level, a director node 135 may remove history record 225A from its history information 220 (if that director node 135 had approved the transaction of that record 115 and had created history record 225A). As a part of removing a history record 225 from its history information 220, in some embodiments, a director node 135 sends the history record 225 to database 110 such that it becomes accessible to worker nodes 120 from database 110.

Figure 9:
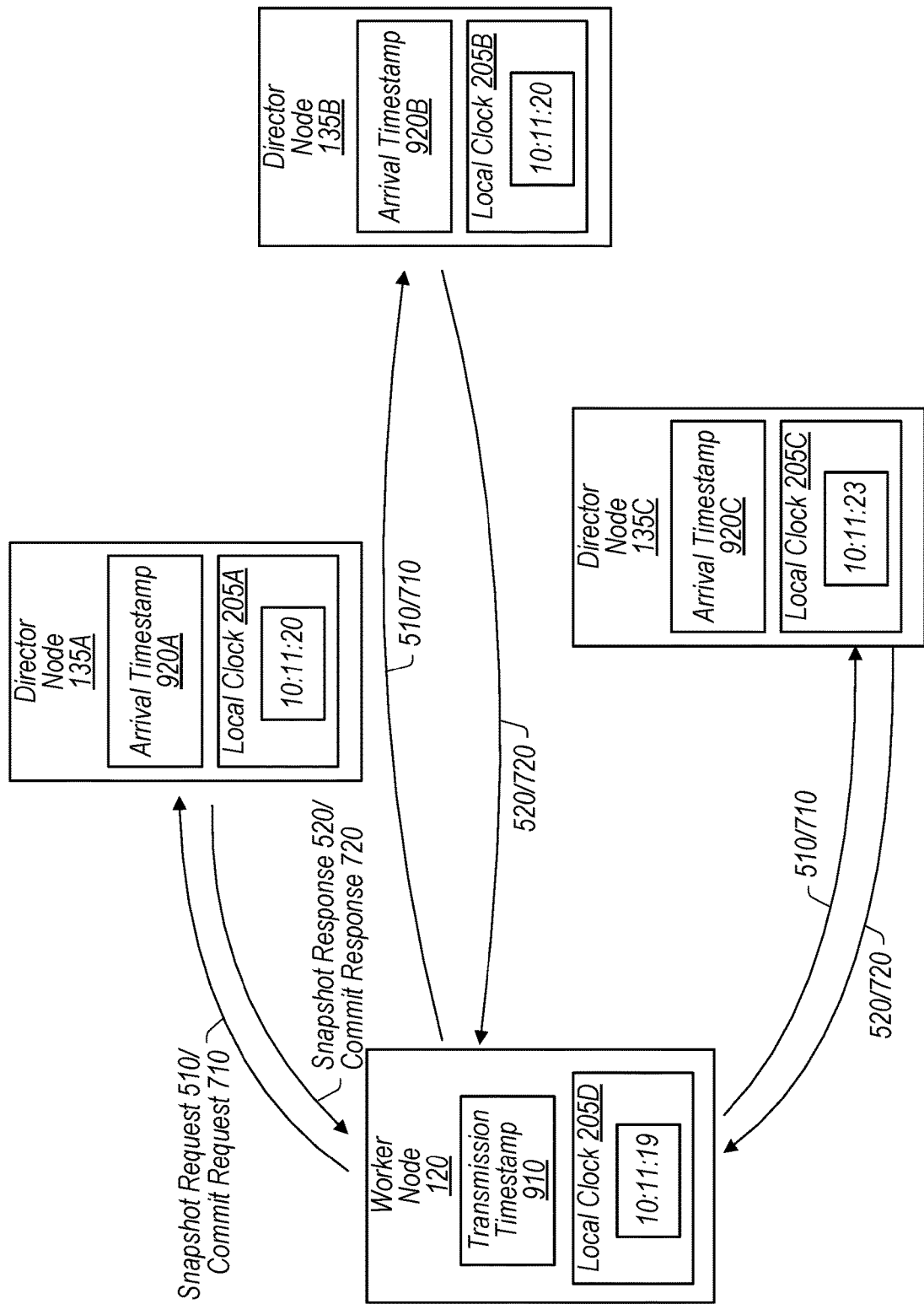
FIG. 9 is a block diagram illustrating example elements pertaining to aligning time between components of the system, according to some embodiments.

Turning now to FIG. 9, a block diagram of example elements pertaining to aligning time between components of system 100 is shown. In the illustrated embodiment, there is a worker node 120 and three director nodes 135A-C, all having a respective local clock 205. As further shown, director nodes 135A and 135B's respective local clocks 205A and 205B identify a time of "10:11:20," director nodes 135C's local clock 205C identifies a time of "10:11:23," and worker node 120's local clock 205D identifies a time of "10:11:19." While only three director nodes 135 and one worker node 120 are depicted, in various embodiments, there may be more director nodes 135 and/or worker nodes 120. Also, in some embodiments, time is represented differently than shown—e.g., time may be a numerical value indicative of a time period, it may be in minutes, etc.

As explained, in various embodiments, a node of system 100 includes a local clock 205 that identifies the time observed by that node for system 100. That time may be different than a time observed by another node—e.g., worker node 120 observes a time of "10:11:19" while director node 135 observes a time of "10:11:23." As further explained, a node may perform, at a designated time, an operation that may affect other nodes. A node that observes a reasonably different time than an average time observed in system 100 may cause undesired delays as one or more operations are performed later than expected by other nodes. Thus, it may be desirable to attempt to continually align time within system 100 so that nodes do not become too far out of sync with each other.

In some embodiments, worker nodes 120 and director nodes 135 directly communicate their local times with each other. But in various embodiments, worker nodes 120 and director nodes 135 do not communicate their local times with each other. Instead, time delays in communicating between worker nodes 120 and director nodes 135 may be tracked and used by a node to shift its local clock 205 in an attempt to align its time with the times that are observed by other nodes. When a worker node 120 issues a request (e.g., a snapshot request 510 or a commit request 710) to a director node 135, in various embodiments, that worker node 120 stores a transmission timestamp 910 specifying the time at which that request was issued according to it local clock 205. When that request is received at that director node 135, it may store an arrival timestamp 920 specifying the time at which that request was received according to its local clock 205. When that director node 135 provides back a response (e.g., a snapshot response 520 or a commit response 720) to worker node 120, the response may include that arrival timestamp 920. The worker node 120 may calculate a time delay that is the difference between the transmission timestamp 910 and the arrival timestamp 920. When the worker node 120 issues another request to a director node 135, it may include the time delay in the request. Consequently, a director node 135 may learn about the time delays involved in a worker node 120 communicating with it and other director nodes 135 of director cluster 130.

For example, worker node 120 may issue a commit request 710 to director nodes 135A-C and store a transmission timestamp 910 that specifies a time of "10:11:17." In response to receiving that commit request 710, director node 135A may store an arrival timestamp 920A that specifies a time of "10:11:20" according to local clock 205A, director node 135B may store an arrival timestamp 920B that specifies a time of "10:11:20" according to local clock 205B, and director node 135C may store an arrival timestamp 920C that specifies a time of "10:11:23" according to local clock 205C. Those arrival timestamps 920 may be provided to worker node 120 in commit responses 720 to the commit request 710. Based on transmission timestamp 910 and arrival timestamps 920A-C, worker node 120 determines that there was a time delay of three seconds in communicating with director nodes 135A and 135B and a time delay of six seconds in communicating with director node 135C. When worker node 120 again communicates with director nodes 135B, worker node 120 may provide those time delays.

Based on those time delays, in various embodiments, a director node 135 determines if its local clock 205 should be sped up or slowed down. For example, director node 135C may learn that it took six seconds for the commit request 710 to arrive as compared to three seconds for director nodes 135A and 135B. From this, director node 135C may determine that its local clock 205C identifies a time that is around three seconds ahead of times observed by director nodes 135A and 135B. In many cases, a director node 135 attempts to account for factors that affect the time delay between it and a worker node 120. Such factors may include, for example, a network distance between a worker node 120 and a director node 135, a number of devices that a request passes through on its way from one node to another, the delay between a worker node 120 sampling the time and sending a request, and the delay between a director node 135 receiving the request and sampling the time. Based on one or more of these factors, a director node 135 may estimate an actual clock skew based on time delays. In various embodiments, a worker node 120 maintains averages (which may be weighted towards recent traffic) of the time delays in communicating with each director node 135. A director node 135 may receive average time delays from multiple worker nodes 120 and then aggregate those time delays to produce aggregated average time delays. Thus, in various embodiments, a director node 135 learns the average time delay across multiple worker node 120 in communicating with a given director node 135. The aggregated average time delays may enable a director node 135 to better estimate an actual clock skew in view of the factors that can cause delays in communication.

Accordingly, director nodes 135 may very gradually align their time. By comparing the perceived delay in receiving requests from each worker-director pair, a director node 135 may determine if it's time is out of sync with other nodes based on the weighted average of the time delays of other director nodes 135. In response to determining to speed up its local clock 205, in various embodiments, a director node 135 shifts the time of its local clock 205 forward and increases its own execution speed (e.g., by running a processor core at a higher frequency) in order to increase the number of requests that it can process so that its local clock 205 may be shifted at a quicker rate. In some cases, a director node 135 may shift the time of its local clock 205 forward and skip work (e.g., requests) whose designated processing time falls within the time being shifted over. In response to determining to slow down its local clock 205, in various embodiments, a director node 135 decreases the rate at which the time of its local clock 205 is shifted forward. In some cases, a director node 135 may freeze the time of its local clock 205 until that director node 135 believes that it has aligned its time.

In various embodiments, a worker node 120 shifts the time of its local clock 205 based on observed time delays. As an example, a worker node 120 may observe that its requests are taking increasingly longer to reach director nodes 135. Based on that observation, that worker node 120 may speed up its local clock 205. Alternatively, a worker node 120 may observe that its requests are reaching director nodes 135 sooner than expected and thus may slow down its local clock 205. In various embodiments, a worker node 120 also uses observed time delays to determine how far in the future that a proposed snapshot time 505 or commit time 705 should be selected to be so that it arrives before those proposed times at director nodes 135 according to their respective local clocks 205. As time delays change over time, a worker node 120 may adjust how far in the future that a proposed snapshot time 505 or commit time 705 is selected to be.

Figure 10:
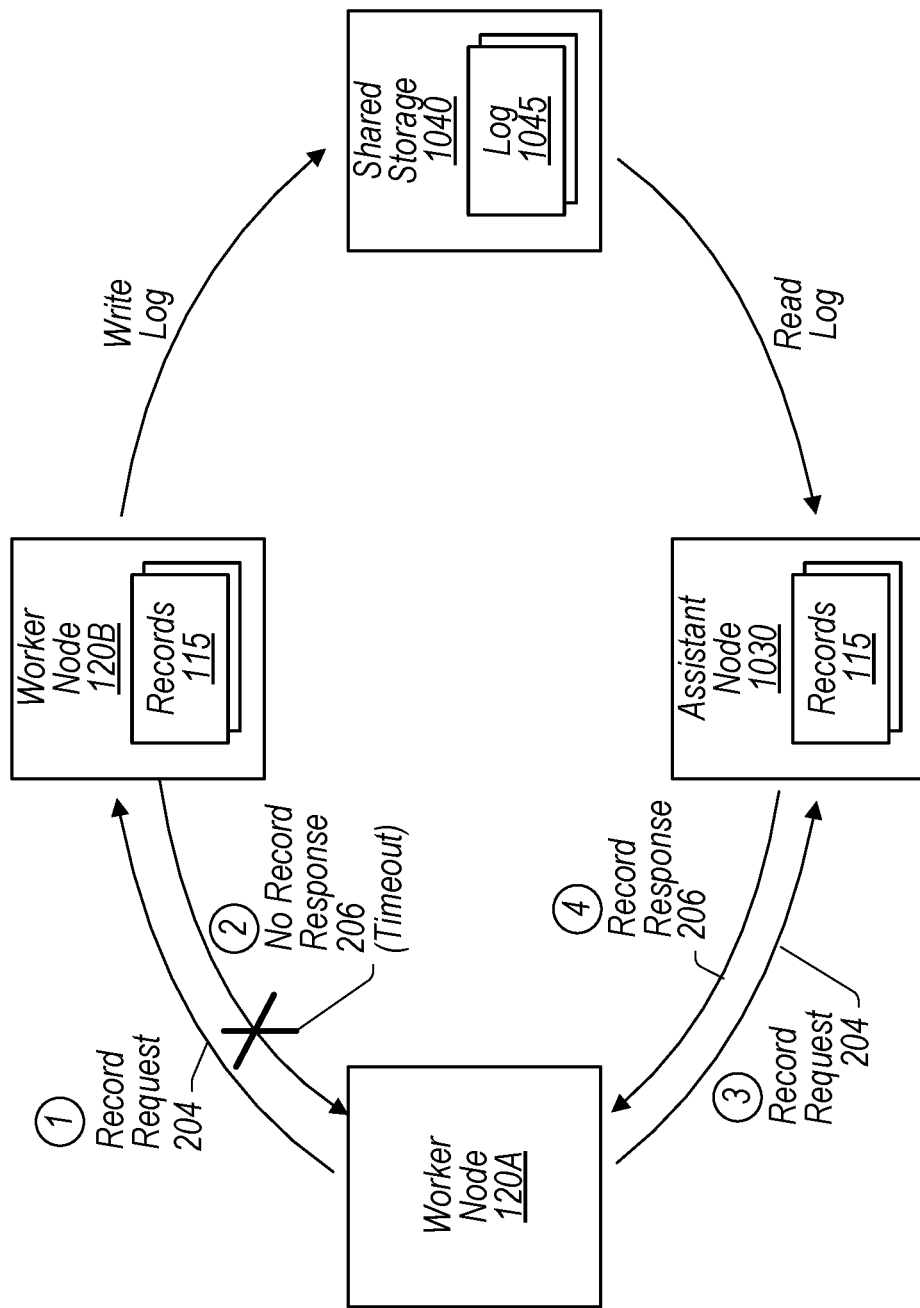
FIG. 10 is a block diagram illustrating example elements of an assistant node, according to some embodiments.

Turning now to FIG. 10, a block diagram of example elements pertaining to an assistant node 1030 is shown. In the illustrated embodiment, there are worker nodes 120A-B, assistant node 1030, and a shared storage 1040. As shown, worker node 120B and assistant node 1030 include records 115, and shared storage 1040 includes logs 1045. The illustrated embodiment may be implemented differently than shown. As an example, there may be multiple assistant nodes 1030 that observe the work performed by a worker node 120.

As explained, processing a transaction can involve accessing one or more records 115, which may be stored at database 110 or in an in-memory cache 210 of a worker node 120. In the case that a record 115 is identified (e.g., via a history record 225) as being in an in-memory cache 210, a worker node 120 may send a record request 204 to the corresponding worker node 120 for that record 115. As shown for example, worker node 120A issues a record request 204 to worker node 120B for a record 115 stored at worker node 120B. Like the other components of system 100, a worker node 120 may experience a slowdown that causes that worker node 120 to be slow or unresponsive to record requests 204. As a result, that worker node 120 may cause other worker nodes 120 to be delayed in processing transactions. For example, worker node 120B may become unresponsive and thus worker node 120A may not receive a record response 206 to its record request 204. To help mitigate this issue, in various embodiments, a worker node 120 has one or more assistant nodes 1030 that can answer record requests 204 in lieu of that worker node 120 when it experiences a slowdown.

Assistant node 1030, in various embodiments, observes the work performed by worker node 120B and locally stores information corresponding to that work. In various embodiments, assistant node 1030 is a set of software routines that are executable on hardware, while in some embodiments, assistant node 1030 encompasses both the hardware and the software routines. In some embodiments, assistant node 1030 is another worker node 120. Consequently, worker nodes 120 may be assigned to one another such that each worker node 120 is an assistant node 1030 to another worker node 120. In some embodiments, assistant node 1030 is executed with other assistant nodes 1030 on a single virtual machine, while in other embodiments, they each execute on a separate virtual machine.

In order to observe the work performed by worker node 120B, in various embodiments, assistant node 1030 follows the log 1045 of worker node 120B, reading all the record changes and placing them into its memory (e.g., an in memory cache 210). As illustrated, logs 1045 are maintained at a shared storage 1040 that is shared among worker nodes 120 and assistant nodes 1030. In some embodiments, a worker node's log 1045 is stored locally at the worker node 120 and not at shared storage 1040 and therefore its assistant node(s) 1030 may access the log 1045 from that worker node 120 instead of from shared storage 1040. Shared storage 1040 may be database 110 or part of a separate storage mechanism. A log 1045, in various embodiments, is a collection of log records that identify changes (e.g., record changes) to information stored in a database (e.g., database 110). The log records may be records that identify new data values for a database construct (e.g., a database row), commit records that identify the committing of transactions, or rollback records that allow for portions or all of the database to be rolled back. As such, log 1045 may identify pending transactions and committed transactions, including an ordering in which those transactions committed. A worker node 120 writing records 115 for a transaction may update its log 1045 by appending log records that identify that work. As such, a log 1045 may grow over time as more log records are appended by a worker node 120.

Accordingly, in various embodiments, assistant node 1030 reads the log records written to worker node 120B's log 1045 and builds an in-memory image of recent transactions that are performed by worker node 120B. Thus, as worker node 120B writes records 115 to its cache 210 and log records to its log 1045, assistant node 1030 may learn, from that log 1045, about those records 115 and recreate them within its own memory. As a result, assistant node 1030 may store one or more of the same records 115 that are stored at worker node 120B. Because assistant node 1030 follows worker node 120B's log 1045 and stores one or more of the same records 115, assistant node 1030 may process record requests 204 from worker node 120A as if it was worker node 120B.

In some embodiments, worker node 120A seeking a record 115 initially sends a record request 204 to worker node 120B identified as committing that record 115 (although, it may have not been committed if its transaction was aborted after the commit was approved). If that record request 204 times-out and there is no record response 206, worker node 120A may send a record request 204 to the worker node 120B's assistant node 1030. In some embodiments, worker node 120A may send a record request 204 to worker node 120B and its assistant node(s) 1030 in parallel. This may save time at the cost of sending more requests than may be needed.

In response to receiving a record request 204, in various embodiments, assistant node 1030 determines whether worker node 120B has committed the requested record 115. In some cases, assistant node 1030 determines (e.g., via a commit record written in worker node 120B's log 1045) that the requested record 115 has been committed. Assistant node 1030 may access that record 115 from its own memory and return it to worker node 120A in a record response 206. In some cases, assistant node 1030 determines that the requested record 115 does not exist and that worker node 120B has logged work past a time associated with the transaction having the requested record 115. For example, worker node 120B may abort that transaction instead of committing it and then commit another transaction associated with a later commit time and thus assistant node 1030 may determine that work has been logged past the transaction having the requested record 115. Consequently, assistant node 1030 may return a record response 206 to worker node 120A that indicates that the requested record 115 does not exist. In some cases, assistant node 1030 is not far enough along in worker node 120B's log 1045 to know whether the requested record 115 has been committed. Assistant node 1030 may delay responding until it has read enough of worker node 120B's log 1045 or it may provide a record response 206 to worker node 120A that instructs worker node 120A to retry its record request 204 later. In the former case, assistant node 1030 may ensure that records of worker node 120B's log 1045 that have a timestamp indicating a time before a snapshot time specified in the record request 204 have been read.

In some cases, assistant node 1030 determines that worker node 120B's log 1045 has not reached the point of committing the transaction of the requested record 115 and that worker node 120B is not writing to its log 1045 or is writing at too slow of a rate according to a defined threshold. Based on worker node 120B not updating its log 1045 and the requested record 115 not being committed, in various embodiments, assistant node 1030 fences worker node 120B's log 1045 and then returns a record response 206 to worker node 120A that indicates that the requested record 115 does not exist. Because assistant node 1030 received a record request 204 from worker node 120A, it is implied that worker node 120A obtained a history record 225 linked to the requested record 115. Because worker node 120A has that history record 225, it is implied that worker node 120B received permission to commit the transaction of the requested record 115. In this case, in order to provide a record response 206 indicating that the requested record 115 has not been committed, assistant node 1030 fences worker node 120B's log 1045 so that it cannot commit the requested record 115 after assistant node 1030 has told worker node 120A that the requested record 115 did not commit. In order to fence worker node 120B's log 1045, in various embodiments, assistant node 1030 sends a command to shared storage 1040 to cause shared storage 1040 to disable appending to worker node 120B's log 1045. As a result, worker node 120B cannot write log records and thus cannot perform work for system 100. The contents of worker node 120B's log 1045, however, may remain intact and be read by other nodes (e.g., assistant node 1030). After worker node 120B's log 1045 has been fenced, assistant node 1030 may take a final pass at the log 1045 to determine if a commit has been added for the transaction of the requested record 115. If that transaction has been committed, then assistant node 1030 may return the requested record 115 to worker node 120A, otherwise, assistant node 1030 may indicate, to worker node 120A, that the requested record 115 has not been committed.

Figure 11:
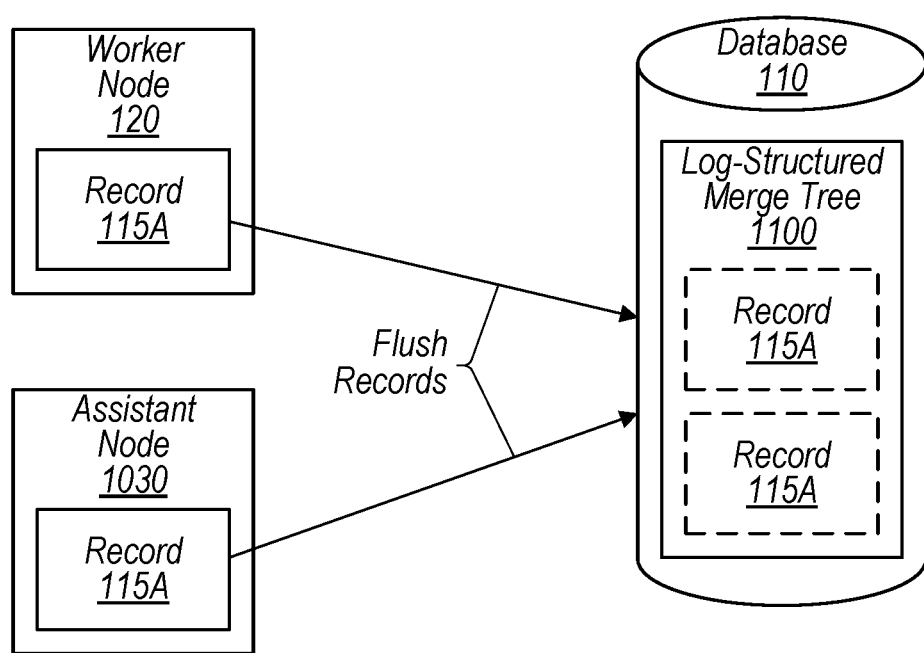
FIG. 11 is a block diagram illustrating example elements of a flush operation in which a worker node and an assistant node flush the same records to a database, according to some embodiments.

Turning now to FIG. 11, a block diagram of a flush operation performed by a worker node 120 and an assistant node 1030 is shown. In the illustrated embodiment, there is database 110, a worker node 120, and an assistant node 1030. As shown, worker node 120 and assistant node 1030 both include the same record 115A—that is, they each have a record 115 that stores the same information (e.g., values) for the same database construct (e.g., a database row). Also as shown, database 110 includes a log-structured merge tree (LSM tree) 1100 that receives the same identical record 115 from worker node 120B and assistant node 1030. The illustrated embodiment may be implemented differently than shown. As an example, there may be multiple assistant nodes 1030 that write the same record 115 as worker node 120 to database 110.

Log-structured merge tree 1100, in various embodiments, is a data structure that stores files in an organized manner that uses a level-based scheme. LSM tree 1100 may comprise two high-level components: an in-memory component implemented at in-memory caches 210 of worker nodes 120 and an on-disk component implemented at database 110. In some cases, the in-memory component is considered to be separate from LSM tree 1100. Worker nodes 120 may initially write records 115 into their in-memory caches 210. As their caches 210 become full and/or at certain points in time, worker nodes 120 may flush records 115 to database 110. As a part of flushing records 115, in various embodiments, worker nodes 120 write them into new files at the top level of LSM tree 1100. Over time, the records 115 of those files are merged down through the levels of LSM tree 1100 as newer files are written to the top level. While the various techniques discussed with respect FIG. 11 pertain to an LSM tree, such techniques can be applied to other types of database implementations in which there are worker nodes that can write and commit records to the database.

For the following discussion, it is assumed that worker node 120 has committed record 115A. In some instances, before worker node 120 has flushed record 115A to LSM tree 1100, worker node 120 may experience a slowdown that causes worker node 120 to become catatonic and unable to flush record 115A in a timely manner. The efficiency of system 100 may depend on the speed at which committed records 115 are flushed to LSM tree 1100. As such, the catatonic nature of worker node 120 may result in an undesired slowdown of system 100. Accordingly, in various embodiments, both worker node 120 and assistant node 1030 flush the same records 115 to LSM tree 1100. As a result, while worker node 120 may be unable to flush record 115A in a timely manner due to a slowdown, assistant node 1030 may independently flush record 115A to LSM tree 1100.

In various cases, LSM tree 1100 stores duplicates of the same record 115 as a result of worker node 120 and assistant node 1030 both flushing that record 115. As mentioned, a merge operation may be performed that moves records 115 through the levels of LSM tree 1100. In various embodiments, the merge operation removes the duplicates such that only one copy of a record 115 is moved into the next level of LSM tree 1100. Accordingly, LSM tree 1100 may temporarily store duplicates of a record 115 that are eventually removed by the merge operation performed by system 100.

Figure 12:
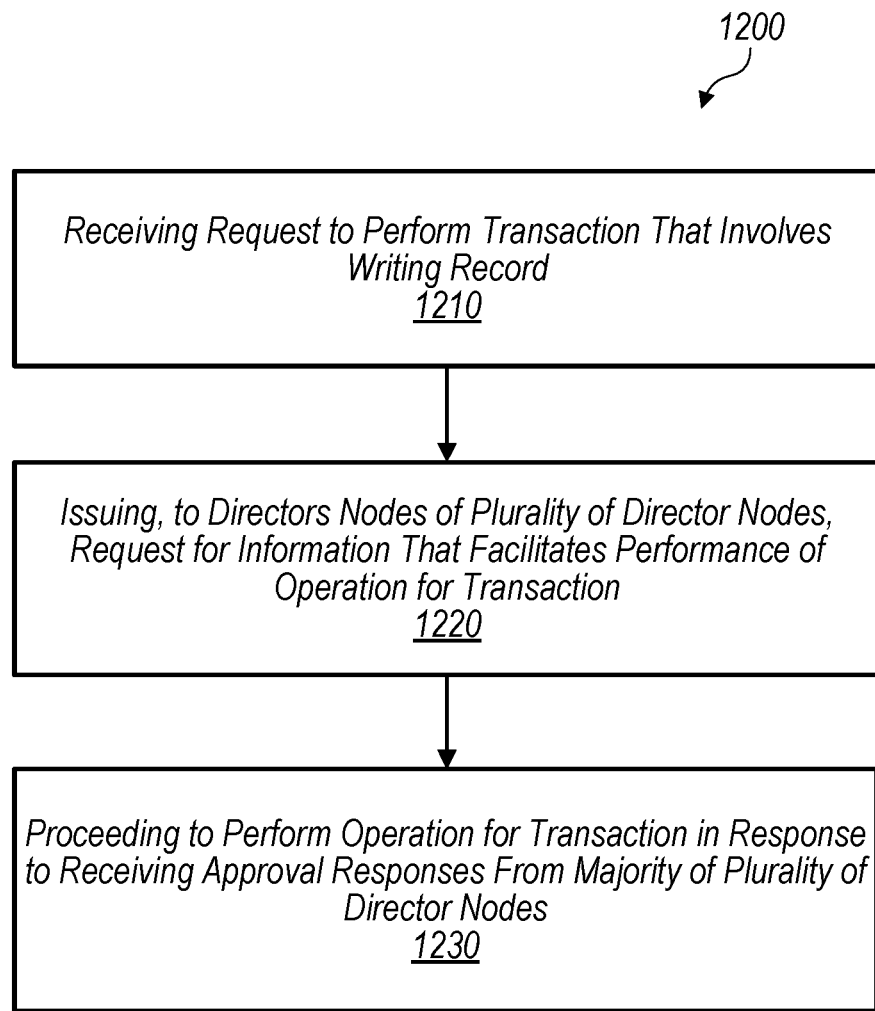
FIG. 12 is a flow diagram illustrating an example method relating to a worker node that interacts with director nodes in order to facilitate performance of an operation for a transaction, according to some embodiments.

Turning now to FIG. 12, a flow diagram of a method 1200 is shown. Method 1200 is one embodiment of a method that is performed by a worker node (e.g., a worker node 120) of a database system (e.g., system 100) as part of processing a transaction. Method 1200 may be performed by executing program instructions that are stored on a non-transitory computer-readable medium. In some embodiments, method 1200 includes more or less steps than shown. For example, method 1200 may include a step in which the worker node sends a request (e.g., a record request 204) to another worker node to obtain a record (e.g., a record 115).

Method 1200 begins in step 1210 with the worker node receiving a request to perform a transaction that involves writing a record. The database system having the worker node may include a plurality of worker nodes (e.g., worker nodes 120) operable to perform transactions for the database system and a plurality of director nodes (e.g., director nodes 135) operable to ensure transactional consistency for the transactions. The worker node may write the record to an in-memory cache (e.g., an in-memory cache 210) of the worker node.

In step 1220, the worker node issues, to directors nodes (e.g., a majority subset or all) of the plurality of director nodes, a request (e.g., a snapshot request 510, a commit request 710, etc.) for information (e.g., history records 225) that facilitates performance of an operation for the transaction. In some cases, the request for information may specify at least the record and the operation may correspond to committing the transaction. A given one of the director nodes may determine whether to approve the committing of the transaction based on whether the record conflicts with a history of approved records (e.g., history information 220) known to the given director node. The request to the director nodes may further specify a snapshot time for the transaction and the given director node may check for conflicts between the record and only those records of the history of approved records that were approved after the snapshot time. The history of approved records may include one or more records that have not been flushed from the plurality of worker nodes to a persistent storage (e.g., database 110) shared among the plurality of worker nodes. The given director node may include the record in the history of approved records (e.g., by creating a history record 225 for the record) in response to sending an approval response to the worker node. In various embodiments, the given director node determines whether to approve the committing of the transaction without communicating with other director nodes of the plurality of director nodes. The request to the director nodes may indicate a commit time (e.g., a proposed commit time 705), and the given director node may process the request from the worker node at the commit time.

In step 1230, the worker node proceeds to perform the operation for the transaction in response to receiving approval responses (e.g., approval snapshot responses 520, approval commit responses 720, etc.) from a majority of the plurality of director nodes with none of the received responses indicating a disapproval of the transaction. In some cases, after determining that permission to commit the transaction has been granted, the worker node may commit the transaction and flush the record to the persistent storage shared among the plurality of worker nodes. In some cases, after determining that permission has been granted, the worker node may abort the transaction. The worker node may abort the transaction based on a determination that approval responses have not been received from a majority of the plurality of director nodes. The worker node may abort the transaction in response to receiving, from at least one of the director nodes, a disapproval response indicating a disapproval of committing the transaction based on a conflict between the record and another record known to the at least one director node. The worker node may further abort the transaction in response to receiving, from at least one of the director nodes, a disapproval response that indicates a disapproval of committing the transaction based on an arrival of the commit request after the commit time.

Figure 13:
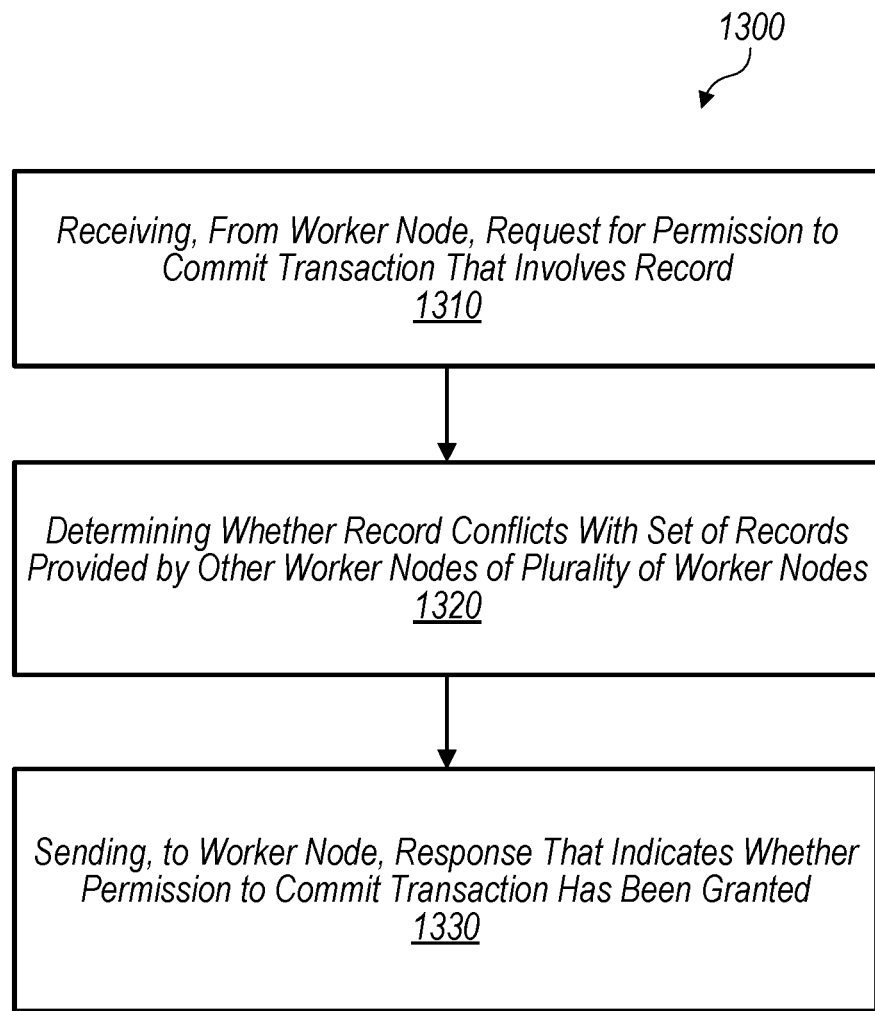
FIG. 13 is a flow diagram illustrating an example method relating to a director node that ensures transactional consistency within a system, according to some embodiments.

Turning now to FIG. 13, a flow diagram of a method 1300 is shown. Method 1300 is one embodiment of a method that is performed by a director node (e.g., a director node 135) of a database system (e.g., system 100) as part of ensuring transactional consistency within the database system. Method 1300 may be performed by executing program instructions that are stored on a non-transitory computer-readable medium. In some embodiments, method 1300 includes more or less steps than shown. For example, method 1200 may include a step in which the director node process a snapshot request (e.g., a snapshot request 510) that is received from a worker node (e.g., a worker node 120).

Method 1300 begins in step 1310 with the director node receiving, from a worker node, a request (e.g., a commit request 710) for permission to commit a transaction that involves a record (e.g., a record 115). The worker node may be a part of the database system, which may include a plurality of worker nodes operable to perform transactions and a plurality of director nodes operable to ensure transactional consistency for those transactions. The received request may specify the record of the transaction.

In step 1320, the director node determines whether the record conflicts with a set of records (e.g., identified in history information 220) provided (e.g., as part of commit requests 710) by other worker nodes of the plurality of worker nodes. The received request may specify a snapshot time (e.g., a previously approved snapshot time 505) associated with the transaction and a commit time (e.g., a proposed commit time 705). As such, the determining may include the director node determining whether there is a conflicting record in the set of records that is identified as being committed between the snapshot time and the commit time. Furthermore, the determining may be performed subsequent to a local clock (e.g., a local clock 205) of the director node indicating at time equal to the commit time. In some cases, the set of records includes at least one record that is not included in another set of records stored by another director node of the plurality of director nodes.

In step 1330, based on the determining, the director node sends, to the worker node, a response (e.g., a commit response 720) that indicates whether permission to commit the transaction has been granted. In some embodiments, the plurality of director nodes are not operable to communicate with each other on whether permission to commit the transaction has been granted. In some cases, the response indicates that permission to commit the transaction has been granted, and the director node stores history information (e.g., a history record 225) that identifies the record as having been committed independent of whether the worker node commits the transaction. In some cases, the response indicates that permission to commit the transaction has not been granted, and the worker node aborts the transaction independent of receiving approvals from other director nodes of the plurality of director nodes to commit the transaction. The response may provide an indication (e.g., an approval of the proposed commit time 705) to the worker node of when the worker node is permitted to commit the transaction.

Figure 14:
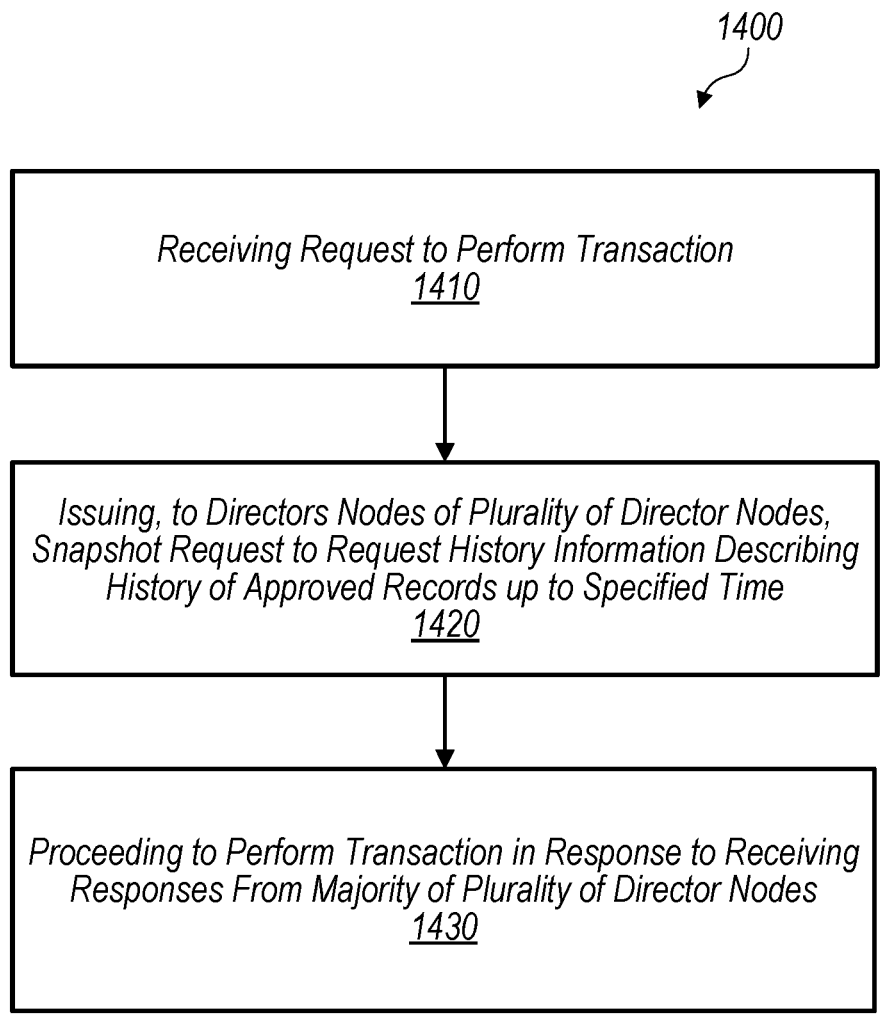
FIG. 14 is a flow diagram illustrating an example method relating to a worker node that interacts with director nodes in order to obtain history information that describes a history of approved records, according to some embodiments.

Turning now to FIG. 14, a flow diagram of a method 1400 is shown. Method 1400 is one embodiment of a method that is performed by a worker node (e.g., a worker node 120) of a database system (e.g., system 100) as part of processing a transaction. Method 1400 may be performed by executing program instructions that are stored on a non-transitory computer-readable medium. In some embodiments, method 1400 includes more or less steps than shown. For example, method 1400 may include a step in which the worker node sends a request (e.g., a commit request 710) to a director node (e.g., a director node 135) for permission to commit the transaction.

Method 1400 begins in step 1410 with the worker node receiving a request to perform a transaction that involves writing a first record (e.g., a record 115). In some cases, the worker nodes receives a request to perform a read-only transaction that does not involve writing any record. The database system that has the worker node may include a plurality of worker nodes (e.g., worker nodes 120) operable to perform transactions for the database system and a plurality of director nodes (e.g., director nodes 135) operable to ensure transactional consistency for the transactions.

In step 1420, the worker node issues, to directors nodes (e.g., a majority subset or all) of the plurality of director nodes, a snapshot request (e.g., a snapshot request 510) to request history information (e.g., history information 220) describing a history of approved records up to a specified time (e.g., a proposed snapshot time 505). The specified time may be selected by the worker node, and the director nodes may delay processing the snapshot request until the specified time. The history information may specify, for a record of the history of approved records, a location (e.g., a location 24) of the record and a time (e.g., a commit time) for which the record was indicated as being committed.

In step 1430, the worker node proceeds to perform the transaction in response to receiving responses (e.g., snapshot responses 520) from a majority of the plurality of director nodes. A union of information in the responses constitutes the requested history information. The proceeding may include determining, based on the requested history information, whether there is a second record that conflicts with the first record and aborting the transaction in response to determining that there is a conflicting second record. A history of approved records known to a first director node of the director nodes may be different than a history of approved records that is known to a second director node of the director nodes. In some cases, none of the responses individually provides the requested history information. The director nodes may not be operable to communicate with each other to share history information.

The transaction may involve a second record. The worker node may determine, based on the requested history information, a location of the second record and may attempt to access the second record from the location. In some cases, the location corresponds to a central storage shared among the plurality of worker nodes. In some cases, the location corresponds to another worker node. In attempting to access the second record, the worker node may send a request (e.g., a record request 204) to the other worker node for the second record and may receive a response (e.g., a record response 206) indicating that the second record was not committed.

Figure 15:
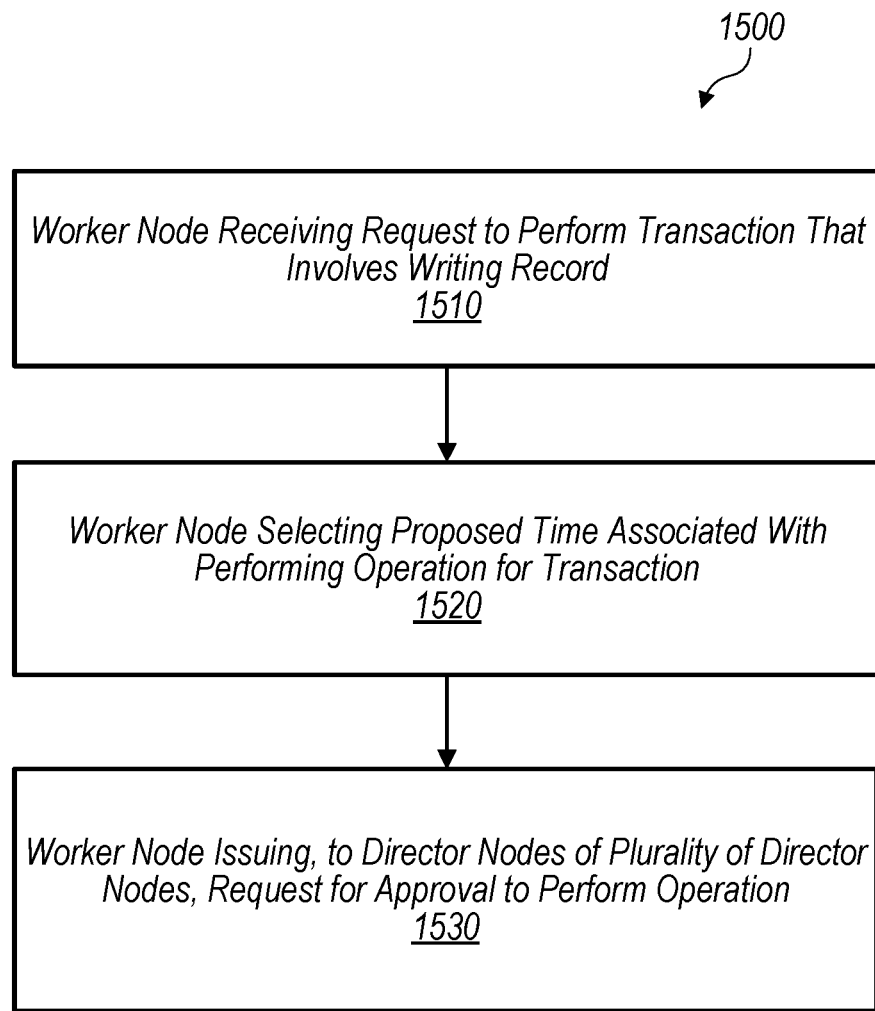
FIG. 15 is a flow diagram illustrating an example method relating to a worker node that selects a proposed time associated with performing an operation for a transaction, according to some embodiments.

Turning now to FIG. 15, a flow diagram of a method 1500 is shown. Method 1500 is one embodiment of a method that is performed by a worker node (e.g., a worker node 120) of a database system (e.g., system 100) as part of processing a transaction. Method 1500 may be performed by executing program instructions that are stored on a non-transitory computer-readable medium. In some embodiments, method 1500 includes more or less steps than shown. For example, method 1500 may include a step in which the worker node sends a request (e.g., a record request 204) to another worker node to obtain a record (e.g., a record 115).

Method 1500 begins in step 1510 with the worker node receiving a request to perform a transaction that involves writing a record. The database system having the worker node may include a plurality of worker nodes (e.g., worker nodes 120) operable to perform transactions for the database system and a plurality of director nodes (e.g., director nodes 135) operable to ensure transactional consistency for the transactions.

In step 1520, the worker node selects a proposed time (e.g., a proposed snapshot time 505, a proposed commit time 705, etc.) associated with performing an operation (e.g., starting a transaction, committing the transaction, etc.) for the transaction. In various embodiments, the worker nodes determines time delays in communicating with the director nodes. A given time delay of the time delays may be a delay between sending a given request from the worker node to a given director node of the director nodes and the given director node receiving the given request. Accordingly, the worker node may recording a first time (e.g., a transmission timestamp 910) at which the given request is sent to the given director node and receive a response to the given request that identifies a second time (e.g., an arrival timestamp 920) at which the given request was received at the given director node. The given time delay may be determined based on the first and second times and the proposed time may be selected, based on the time delays, to be such that the request for approval is estimated to arrive at the director nodes before the proposed time according to respective clocks (e.g., local clocks 205) of the director nodes. The proposed time may be selected based on time identified by a clock of the worker node. In various cases, the clock of the worker node identifies a different time than a clock of a director node and the clock of the director node identifies a different time than a clock of at least one other director node of the plurality of director nodes.

In step 1530, the worker node issues, to director nodes (e.g., a majority subset or all) of the plurality of director nodes, a request for approval to perform the operation. In various embodiments, a director node of the director nodes is operable to process the request for approval upon reaching the proposed time according to a clock of the director node that identifies a time observed by the director node. In some cases, the operation pertains to initiating the transaction, and the director node is operable to return history information (e.g., history information 220) describing a history of approved records up to the proposed time. In some cases, the operation pertains to committing the transaction, and the director node is operable to check for conflicts between the record of the transaction and a set of approved records known to the director node that occurred before the proposed time. The worker node may include the delay information in the request for approval to enable a first director node of the director nodes to attempt to align a time observed by the first director node with a time observed by a second director node of the director nodes.

The worker node may receive, from a director node, a disapproval response that indicates a disapproval of the proposed time based on an arrival of the request at the director node after the proposed time according to the clock of the director node. The proposed time may be selected to be a first amount of time after a current time that is identified by a clock of the worker node. Consequently, based on receiving the disapproval response, the worker node may select another proposed time such that the other proposed time is a second amount of time after the current time identified by the clock of the worker node, with the second amount of time being greater than the first amount of time.

Figure 16:
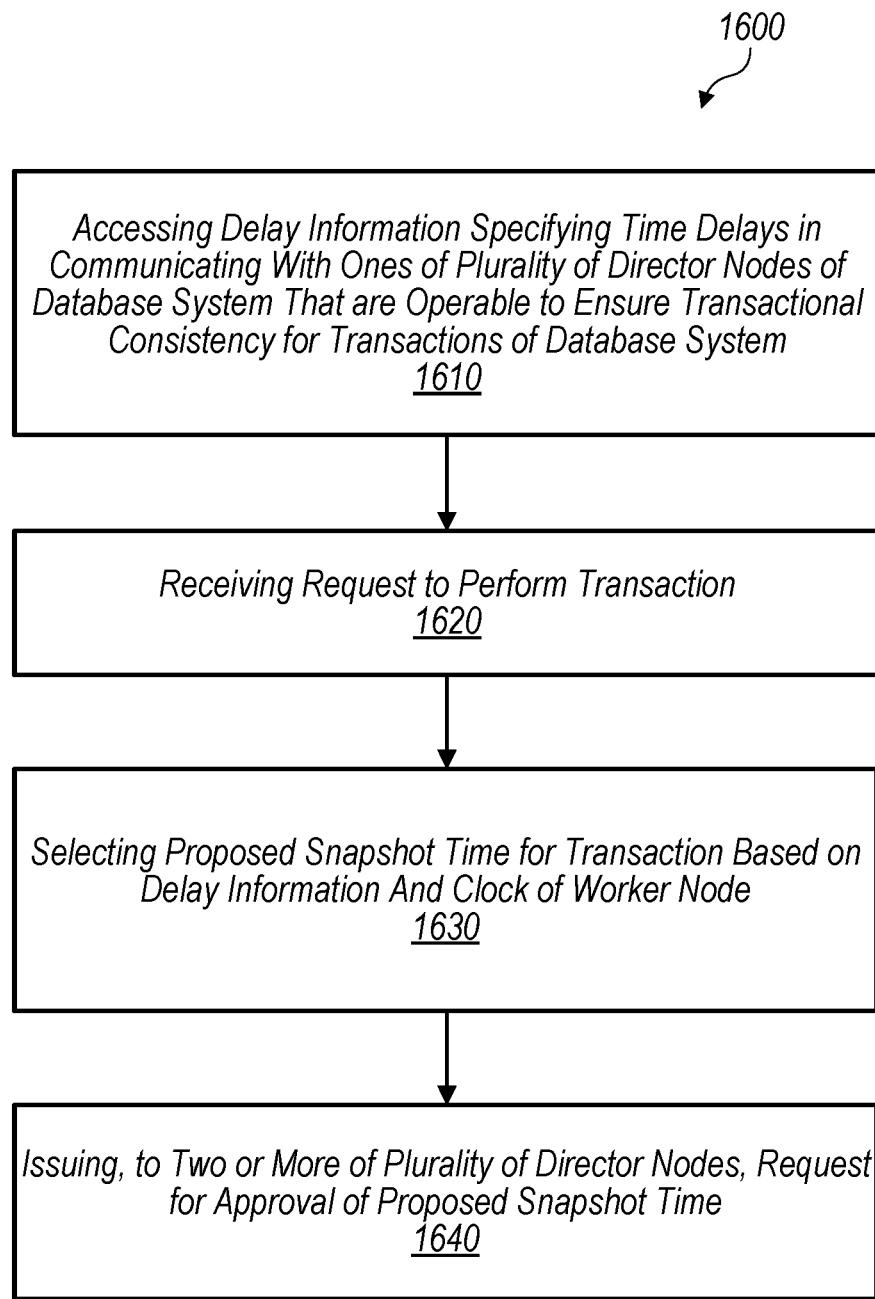
FIG. 16 is a flow diagram illustrating an example method relating to a worker node that selects a proposed snapshot time for a transaction, according to some embodiments.

Turning now to FIG. 16, a flow diagram of a method 1600 is shown. Method 1600 is one embodiment of a method that is performed by a worker node (e.g., a worker node 120) of a database system (e.g., system 100) as part of processing a transaction. Method 1600 may be performed by executing program instructions that are stored on a non-transitory computer-readable medium. In some embodiments, method 1600 includes more or less steps than shown. For example, method 1600 may include a step in which the worker node sends a request (e.g., a record request 204) to another worker node to obtain a record (e.g., a record 115).

Method 1600 begins in step 1610 with the worker node accessing delay information specifying time delays in communicating with ones of a plurality of director nodes of the database system that are operable to ensure transactional consistency for transactions of the database system. In step 1620, the worker node a request to perform a transaction.

In step 1630, the worker node selects a proposed snapshot time (e.g., a proposed snapshot time 505) for the transaction based on the delay information and a clock (e.g., a local clock 205) of the worker node. The proposed snapshot time may be selected to be a time that is determined to permit the request for approval to arrive at a director node prior to the proposed snapshot time according to the clock of the director node.

In step 1640, the worker node issues, to two or more of the plurality of director nodes, a first request (e.g., a snapshot request 510) for approval of the proposed snapshot time. In various embodiments, a director node of the two or more director nodes is operable to process the first request for approval upon reaching the proposed snapshot time according to a clock of the director node. Prior to issuing the first request for approval, the worker node may issue a second request to the director node for approval of a proposed time associated with another transaction. The worker node may record a first time (e.g., a transmission timestamp 910) at which the second request for approval was issued to the director node according to the clock of the worker node and receive, from the director node, a response to the second request for approval that identifies a second time (e.g., an arrival timestamp 920) at which the second request for approval was received at the director node according to the clock of the director node. The clock of the worker node may identify a different time than the clock of the director node, and the proposed snapshot time may be selected based on the first and second times.

Figure 17:
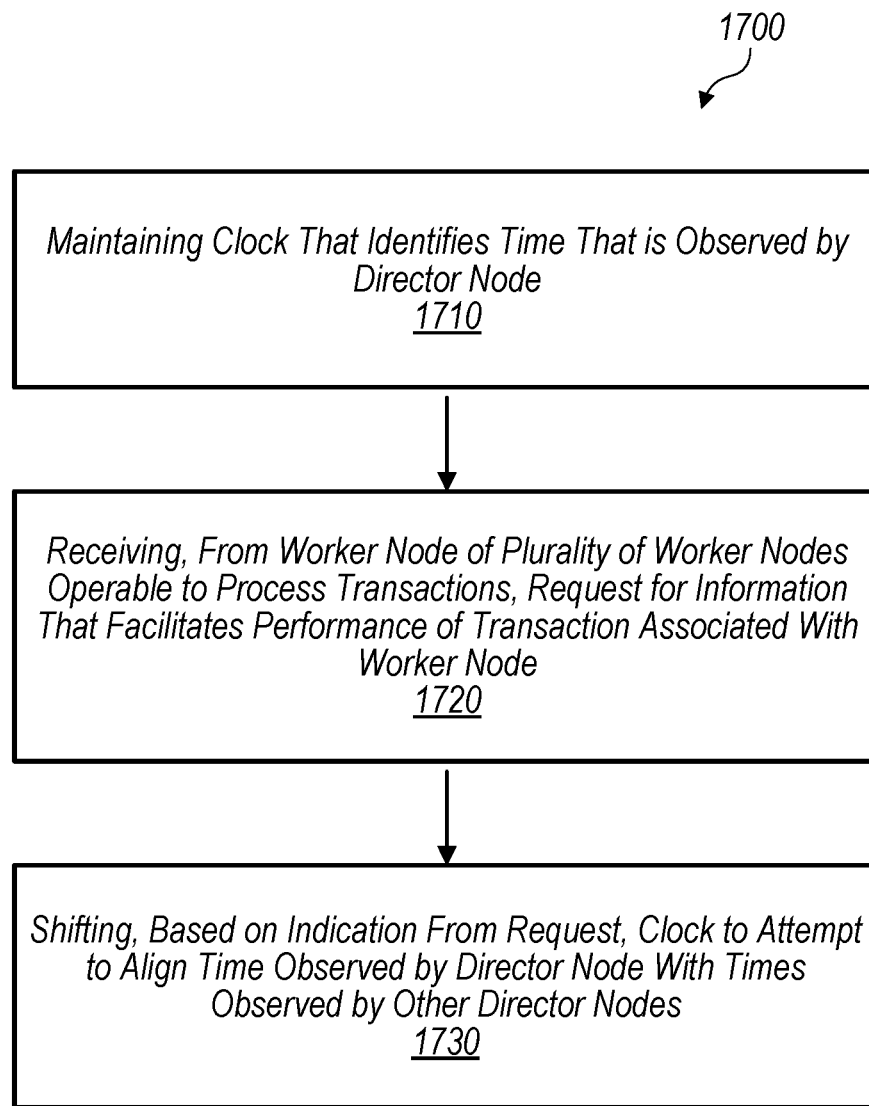
FIG. 17 is a flow diagram illustrating an example method relating to a director node that attempts to align a time observed by that director node with times observed by other director nodes, according to some embodiments.

Turning now to FIG. 17, a flow diagram of a method 1700 is shown. Method 1700 is one embodiment of a method that is performed by a director node (e.g., a director node 135) of a database system (e.g., system 100) to attempt to align a time observed by the director node with times observed by other director nodes. Method 1700 may be performed by executing program instructions that are stored on a non-transitory computer-readable medium. In some embodiments, method 1700 includes more or less steps than shown. For example, method 1700 may include a step in which the director node provides, to a worker node (e.g., a worker node 120), a response that includes history information (e.g., history information 220).

Method 1700 begins in step 1710 with the director node maintaining a clock (e.g., a local clock 205) that identifies a time that is observed by the director node. The director node may perform a database operation at a designated time;

In step 1720, the director node receives, from a worker node of a plurality of worker nodes operable to process transactions, a request (e.g., a snapshot request 510) for information (e.g., history information 220) that facilitates performance of a transaction associated with the worker node. The request may provide a first indication of times observed by other director nodes of the plurality of the director nodes. In various embodiments, the request specifies time delays observed by the worker node in communicating with the plurality of director nodes. The director node may aggregate the time delays with time delays provided by other worker nodes and shift its clock based on the aggregated time delays. A given time delay of the time delays may be a delay between sending a given request from the worker node to a given director node of the plurality of director nodes and the given director node receiving the given request. The time delays may be derived based on a clock of the worker node that identifies a time that is observed by the worker node. In some cases, the request specifies a proposed time (e.g., a proposed snapshot time 505) associated with the transaction. The director node may process the request upon reaching the proposed time according to the clock of the director node. In various cases, the clock of the director node identifies a different time than a clock of another director node of the plurality of director nodes. Accordingly, the request may be processed at the director node before the request is processed at the other director node.

In step 1730, the director shifts, based on the first indication, the clock to attempt to align the time observed by the director node with the times observed by the other director nodes. Based on the time delays, the director node may determine that there is a greater time delay in the worker node communicating with the director node than the worker node communicating with a majority of the other director nodes. Accordingly, the shifting may include slowing down the clock. Based on the time delays, the director node may determine that there is less of a time delay in the worker node communicating with the director node than the worker node communicating with a majority of the other director nodes. Accordingly, the shifting includes speeding up the clock. In some cases, the director node may identify an arrival time (e.g., arrival timestamp 920) of the request according to the clock and send, to the worker node, a response that specifies the arrival time. The worker node may be operable to identify a time delay between sending the request and the director node receiving the request. In some cases, shifting the clock causes the director node to skip processing of one or more requests received at the director node. The shifting of the clock may be performed without directly communicating with the other director nodes.

Figure 18:
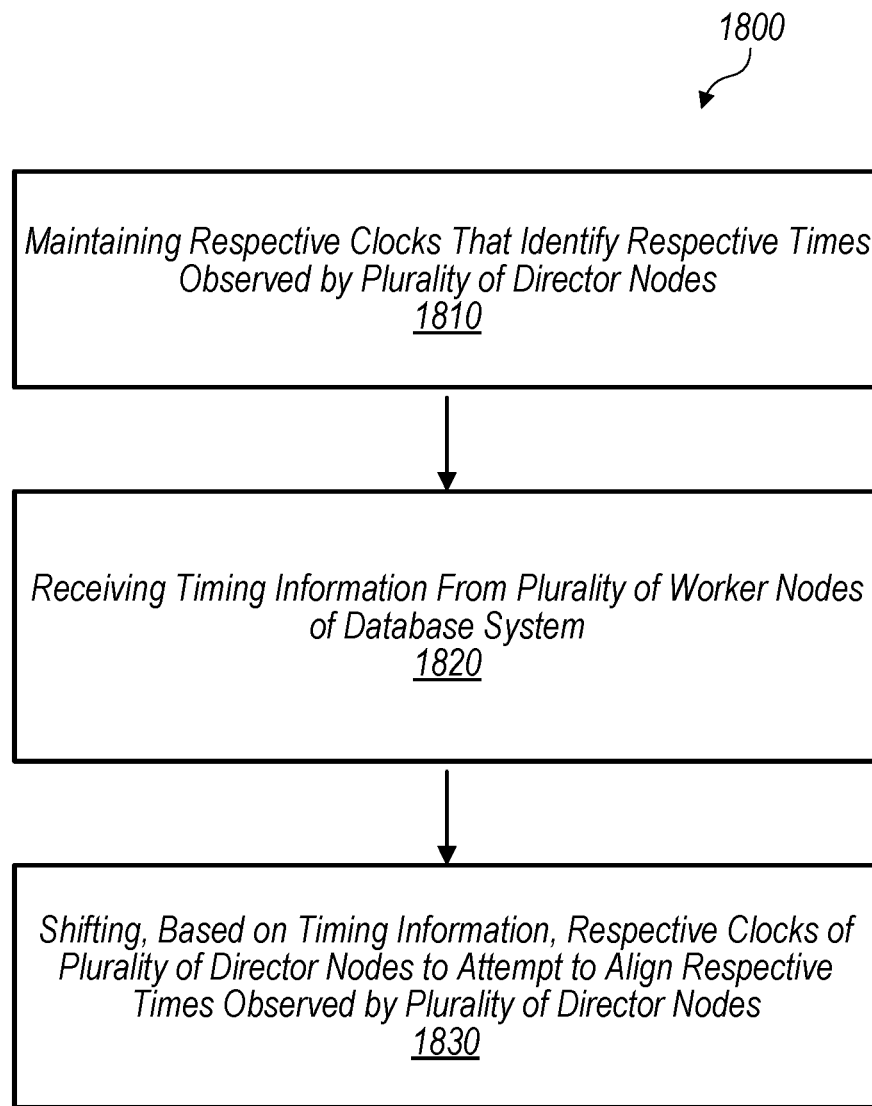
FIG. 18 is a flow diagram illustrating an example method relating to director nodes that attempts to align the times observed by those director nodes, according to some embodiments.

Turning now to FIG. 18, a flow diagram of a method 1800 is shown. Method 1800 is one embodiment of a method that is performed by director nodes (e.g., director nodes 135) of a database system (e.g., system 100) to attempt to align times observed by the director nodes. Method 1800 may be performed by executing program instructions that are stored on a non-transitory computer-readable medium. In some embodiments, method 1800 includes more or less steps than shown. For example, method 1800 may include a step in which the director nodes provide, to a worker node (e.g., a worker node 120), a response that includes history information (e.g., history information 220).

Method 1800 begins in step 1810 with the director nodes maintaining respective clocks (e.g., local clocks 205) that identify respective times observed by the director nodes. A given director node may perform a database operation at a designated time. In step 1820, the director nodes receive timing information from worker nodes of the database system. The timing information may indicate communication time delays between the worker nodes and the director nodes.

In step 1830, the director nodes shifts, based on the timing information, the respective clocks of the director nodes to attempt to align the respective times observed by the director nodes. In various embodiments, the shifting is performed without ones of the director nodes communicating with other ones of the director nodes. The director nodes may receive a request (e.g., a commit request 710) from a worker node for permission to commit a transaction and the request may specify a proposed commit time (e.g., a proposed commit time 705). A given director node may process the request upon the respective clock of the given director node specifying a time that is not before the proposed commit time. The given director node may send a response (e.g., a commit response 720) to the worker node that indicates an arrival time (e.g., an arrival timestamp 920) of the request at the given director node according to the respective clock of the given director node. The worker node may determine, based on the arrival time, a time delay in the worker node communicating with the given director node. In various cases, the request received from the worker node is processed by the given director node independent of a processing of the request by another director node of the director nodes.

Figure 19:
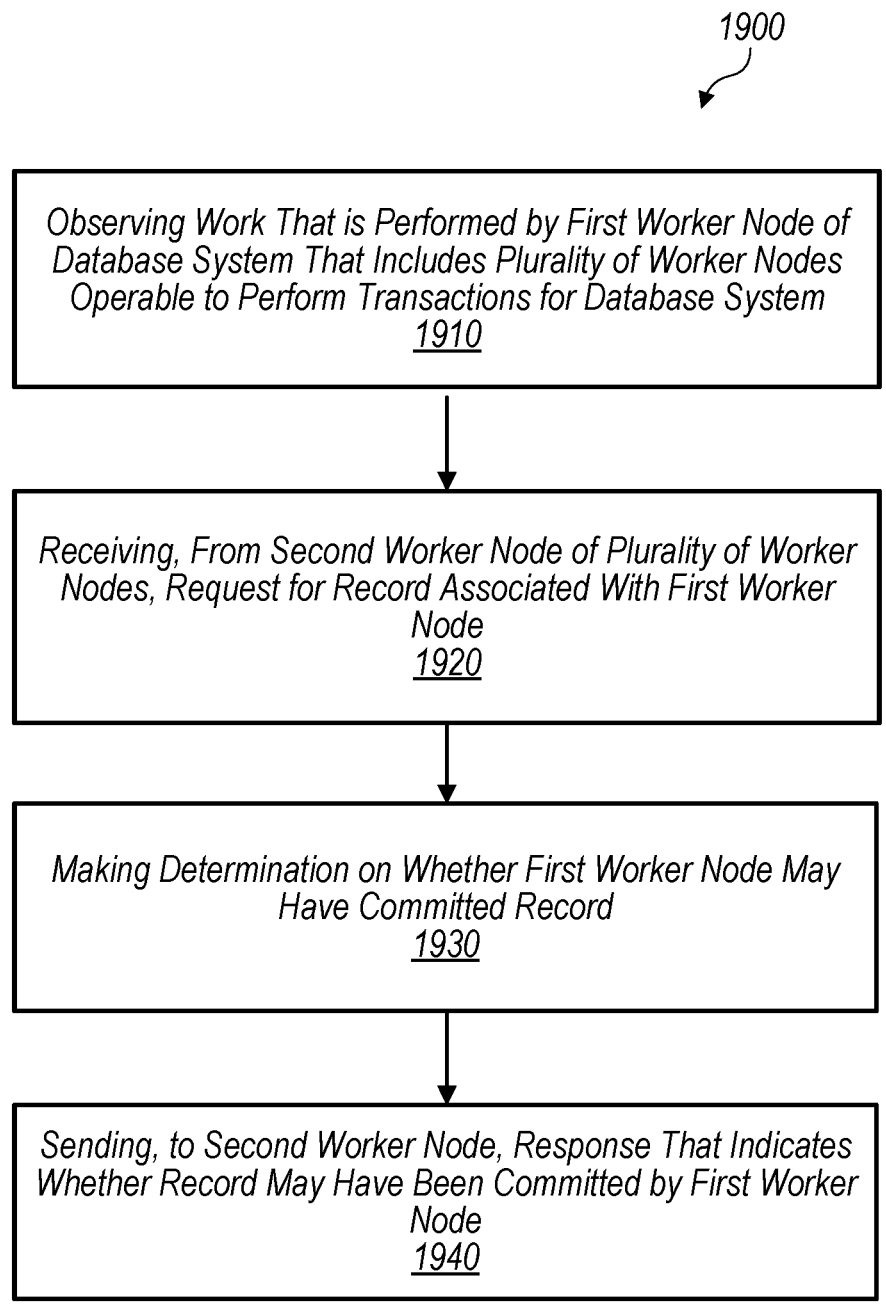
FIG. 19 is a flow diagram illustrating an example method relating to an assistant node that observes work performed by a worker node, according to some embodiments.

Turning now to FIG. 19, a flow diagram of a method 1900 is shown. Method 1900 is one embodiment of a method that is performed by an assistant node (e.g., an assistant node 1030) of a database system (e.g., system 100) that observes work performed by a worker node (e.g., a worker node 120). Method 1900 may be performed by executing program instructions that are stored on a non-transitory computer-readable medium. In some embodiments, method 1900 includes more or less steps than shown. For example, method 1900 may include a step in which the assistant node flushes a record (e.g., a record 115) to a database (e.g., database 110) that was also flushed by the worker node.

Method 1900 begins in step 1910 with the worker node observing work that is performed by a first worker node of a database system that includes a plurality of worker nodes operable to perform transactions for the database system. The observing may include storing, at the assistant node, records associated with the first worker node. The assistant node may read a transaction log (e.g., a log 1045) of the first worker node that is stored at a data store (e.g., shared storage 1040) shared among the first worker node and the assistant node. The records stored at the assistant node may be determined from the transaction log. In some cases, the assistant node is one of the plurality of worker nodes operable to perform transactions for the database system. In various embodiments, the assistant node and the first worker node are executed using different virtual machines.

In step 1920, the assistant node receives, from a second worker node of the plurality of worker nodes, a request (e.g., a record request 204) for a record associated with the first worker node. The request may specify a snapshot time that corresponds to a transaction of the second worker node. Before making the determination on whether the first worker node has committed the record, the assistant node may ensure that records of the transaction log having a timestamp indicating a time before the snapshot time have been read by the assistant node. In various embodiments, the second worker node is operable to send the request for the record to the assistant node in response to not receiving a response from the first worker node to a request sent to the first worker node for the record.

In step 1930, the assistant node makes a determination on whether the first worker node committed the record. Making of the determination may include determining that the record has not been committed based on the transaction log and that the first worker node is unresponsive. Based on that determination, in various embodiments, the assistant node fences the transaction log to prevent the first worker node from modifying the transaction log to commit the record and then sends a response (e.g., a record response 206) to the second worker node indicates that the record has not been committed. Making of the determination may include, based on the transaction log, determining that the first worker node committed a transaction that includes the record. Accordingly, the assistant node may access the record from the records stored at the assistant node and the response to the second worker node may include the accessed record. Making of the determination may include determining that the record has not been committed based on the transaction log indicating that the first worker node has logged work after a commit time associated with a transaction that includes the record and the transaction log not indicating the record. As such, the response to the second worker node may indicate that the record has not been committed.

In step 1940, the assistant node sends, to the second worker node, a response that indicates whether the record was committed by the first worker node. Based on a determination that the record has been committed, the assistant node may flush the record to a log-structured merge tree (LSM tree) (e.g., LSM 1100) of the database system. The first worker node may also flush the record to the LSM tree such that there are two instances of the record at the LSM tree for a period of time.

Figure 20:
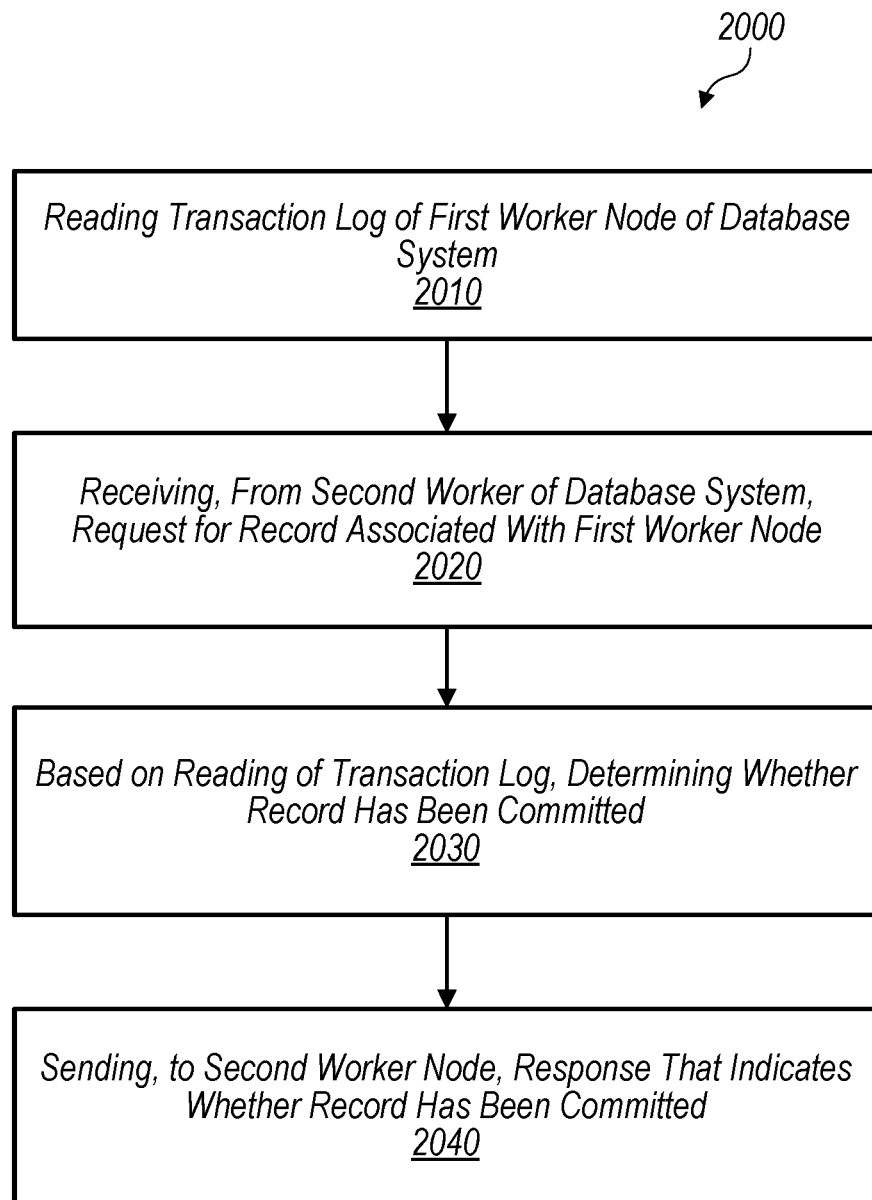
FIG. 20 is a flow diagram illustrating another example method relating to an assistant node that observes work performed by a worker node, according to some embodiments.

Turning now to FIG. 20, a flow diagram of a method 2000 is shown. Method 2000 is one embodiment of a method that is performed by an assistant node (e.g., an assistant node 1030) of a database system (e.g., system 100) that observes work performed by a worker node (e.g., a worker node 120). Method 2000 may be performed by executing program instructions that are stored on a non-transitory computer-readable medium. In some embodiments, method 2000 includes more or less steps than shown. For example, method 2000 may include a step in which the assistant node flushes a record (e.g., a record 115) to a database (e.g., database 110) that was also flushed by the worker node.

Method 2000 begins in step 2010 with the assistant reading a transaction log (e.g., a log 1045) of a first worker node. In various embodiments, the transaction log specifies a set of records committed by the first worker node. Based on the reading of the transaction log, the assistant node may cache, at the assistant node, one or more of the set of records. In step 2020, the assistant node receives, from a second worker node, a request (e.g., a record request 204) for a record associated with the first worker node.

In step 2030, based on the reading of the transaction log, the assistant node determines whether the record has been committed. The request received from the second worker node may identify a snapshot timestamp. The assistant node may determine that the first worker node is not updating the transaction log and that the first worker node has not written a record to the transaction log that has a timestamp indicating a time after a time of the snapshot timestamp. Based on the determining, the assistant node may cause the first worker node to be prevented from updating the transaction log. A response to the second worker node may indicate that the record has not been committed. In response to determining that the record has been committed, the assistant node may access the record from the one or more cached records. The response may include the record.

In step 2040, the assistant node sends, to the second worker node, the response that indicates whether the record has been committed. In response to determining that the record has been committed, the assistant node may flush the record to a database (e.g., database 110) of the database system independent of whether the first worker node flushes the record to the database.

Exemplary Multi-Tenant Database System

Figure 21:
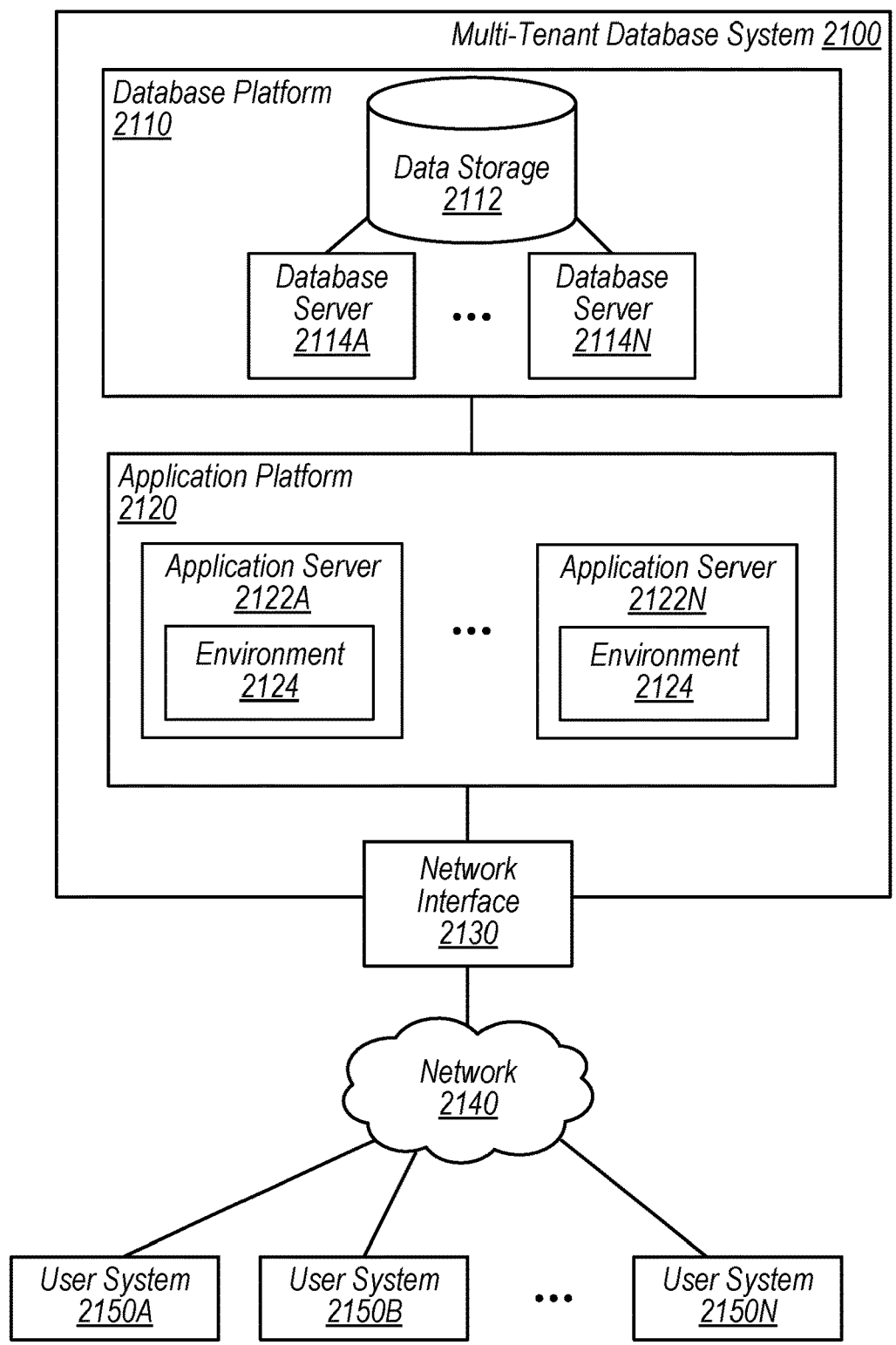
FIG. 21 is a block diagram illustrating elements of a multi-tenant system, according to some embodiments.

Turning now to FIG. 21, an exemplary multi-tenant database system (MTS) 2100 in which various techniques of the present disclosure can be implemented is shown—e.g., system 100 may be MTS 2100. In FIG. 21, MTS 2100 includes a database platform 2110, an application platform 2120, and a network interface 2130 connected to a network 2140. Also as shown, database platform 2110 includes a data storage 2112 and a set of database servers 2114A-N that interact with data storage 2112, and application platform 2120 includes a set of application servers 2122A-N having respective environments 2124. In the illustrated embodiment, MTS 2100 is connected to various user systems 2150A-N through network 2140. The disclosed multi-tenant system is included for illustrative purposes and is not intended to limit the scope of the present disclosure. In other embodiments, techniques of this disclosure are implemented in non-multi-tenant environments such as client/server environments, cloud computing environments, clustered computers, etc.

MTS 2100, in various embodiments, is a set of computer systems that together provide various services to users (alternatively referred to as "tenants") that interact with MTS 2100. In some embodiments, MTS 2100 implements a customer relationship management (CRM) system that provides mechanism for tenants (e.g., companies, government bodies, etc.) to manage their relationships and interactions with customers and potential customers. For example, MTS 2100 might enable tenants to store customer contact information (e.g., a customer's website, email address, telephone number, and social media data), identify sales opportunities, record service issues, and manage marketing campaigns. Furthermore, MTS 2100 may enable those tenants to identify how customers have been communicated with, what the customers have bought, when the customers last purchased items, and what the customers paid. To provide the services of a CRM system and/or other services, as shown, MTS 2100 includes a database platform 2110 and an application platform 2120.

Database platform 2110, in various embodiments, is a combination of hardware elements and software routines that implement database services for storing and managing data of MTS 2100, including tenant data. As shown, database platform 2110 includes data storage 2112. Data storage 2112, in various embodiments, includes a set of storage devices (e.g., solid state drives, hard disk drives, etc.) that are connected together on a network (e.g., a storage attached network (SAN)) and configured to redundantly store data to prevent data loss. In various embodiments, data storage 2112 is used to implement a database (e.g., database 110) comprising a collection of information that is organized in a way that allows for access, storage, and manipulation of the information. Data storage 2112 may implement a single database, a distributed database, a collection of distributed databases, a database with redundant online or offline backups or other redundancies, etc. As part of implementing the database, data storage 2112 may store files that include one or more database records having respective data payloads (e.g., values for fields of a database table) and metadata (e.g., a key value, timestamp, table identifier of the table associated with the record, tenant identifier of the tenant associated with the record, etc.).

In various embodiments, a database record may correspond to a row of a table. A table generally contains one or more data categories that are logically arranged as columns or fields in a viewable schema. Accordingly, each record of a table may contain an instance of data for each category defined by the fields. For example, a database may include a table that describes a customer with fields for basic contact information such as name, address, phone number, fax number, etc. A record therefore for that table may include a value for each of the fields (e.g., a name for the name field)

in the table. Another table might describe a purchase order, including fields for information such as customer, product, sale price, date, etc. In various embodiments, standard entity tables are provided for use by all tenants, such as tables for account, contact, lead and opportunity data, each containing pre-defined fields. MTS 2100 may store, in the same table, database records for one or more tenants—that is, tenants may share a table. Accordingly, database records, in various embodiments, include a tenant identifier that indicates the owner of a database record. As a result, the data of one tenant is kept secure and separate from that of other tenants so that that one tenant does not have access to another tenant's data, unless such data is expressly shared.

In some embodiments, the data stored at data storage 2112 is organized as part of a log-structured merge-tree (LSM tree—e.g., LSM tree 1100). An LSM tree normally includes two high-level components: an in-memory buffer and a persistent storage. In operation, a database server 2114 may initially write database records into a local in-memory buffer before later flushing those records to the persistent storage (e.g., data storage 2112). As part of flushing database records, the database server 2114 may write the database records into new files that are included in a "top" level of the LSM tree. Over time, the database records may be rewritten by database servers 2114 into new files included in lower levels as the database records are moved down the levels of the LSM tree. In various implementations, as database records age and are moved down the LSM tree, they are moved to slower and slower storage devices (e.g., from a solid state drive to a hard disk drive) of data storage 2112.

When a database server 2114 wishes to access a database record for a particular key, the database server 2114 may traverse the different levels of the LSM tree for files that potentially include a database record for that particular key. If the database server 2114 determines that a file may include a relevant database record, the database server 2114 may fetch the file from data storage 2112 into a memory of the database server 2114. The database server 2114 may then check the fetched file for a database record having the particular key. In various embodiments, database records are immutable once written to data storage 2112. Accordingly, if the database server 2114 wishes to modify the value of a row of a table (which may be identified from the accessed database record), the database server 2114 writes out a new database record to the top level of the LSM tree. Over time, that database record is merged down the levels of the LSM tree. Accordingly, the LSM tree may store various database records for a database key where the older database records for that key are located in lower levels of the LSM tree then newer database records.

Database servers 2114, in various embodiments, are hardware elements, software routines, or a combination thereof capable of providing database services, such as data storage, data retrieval, and/or data manipulation. A database server 2114 may correspond to a worker node 120. Such database services may be provided by database servers 2114 to components (e.g., application servers 2122) within MTS 2100 and to components external to MTS 2100. As an example, a database server 2114 may receive a database transaction request from an application server 2122 that is requesting data to be written to or read from data storage 2112. The database transaction request may specify an SQL SELECT command to select one or more rows from one or more database tables. The contents of a row may be defined in a database record and thus database server 2114 may locate and return one or more database records that correspond to the selected one or more table rows. In various cases, the database transaction request may instruct database server 2114 to write one or more database records for the LSM tree—database servers 2114 maintain the LSM tree implemented on database platform 2110. In some embodiments, database servers 2114 implement a relational database management system (RDMS) or object oriented database management system (OODBMS) that facilitates storage and retrieval of information against data storage 2112. In various cases, database servers 2114 may communicate with each other to facilitate the processing of transactions. For example, database server 2114A may communicate with database server 2114N to determine if database server 2114N has written a database record into its in-memory buffer for a particular key.

Application platform 2120, in various embodiments, is a combination of hardware elements and software routines that implement and execute CRM software applications as well as provide related data, code, forms, web pages and other information to and from user systems 2150 and store related data, objects, web page content, and other tenant information via database platform 2110. In order to facilitate these services, in various embodiments, application platform 2120 communicates with database platform 2110 to store, access, and manipulate data. In some instances, application platform 2120 may communicate with database platform 2110 via different network connections. For example, one application server 2122 may be coupled via a local area network and another application server 2122 may be coupled via a direct network link. Transfer Control Protocol and Internet Protocol (TCP/IP) are exemplary protocols for communicating between application platform 2120 and database platform 2110, however, it will be apparent to those skilled in the art that other transport protocols may be used depending on the network interconnect used.

Application servers 2122, in various embodiments, are hardware elements, software routines, or a combination thereof capable of providing services of application platform 2120, including processing requests received from tenants of MTS 2100. Application servers 2122, in various embodiments, can spawn environments 2124 that are usable for various purposes, such as providing functionality for developers to develop, execute, and manage applications (e.g., business logic). Data may be transferred into an environment 2124 from another environment 2124 and/or from database platform 2110. In some cases, environments 2124 cannot access data from other environments 2124 unless such data is expressly shared. In some embodiments, multiple environments 2124 can be associated with a single tenant.

Application platform 2120 may provide user systems 2150 access to multiple, different hosted (standard and/or custom) applications, including a CRM application and/or applications developed by tenants. In various embodiments, application platform 2120 may manage creation of the applications, testing of the applications, storage of the applications into database objects at data storage 2112, execution of the applications in an environment 2124 (e.g., a virtual machine of a process space), or any combination thereof. In some embodiments, application platform 2120 may add and remove application servers 2122 from a server pool at any time for any reason, there may be no server affinity for a user and/or organization to a specific application server 2122. In some embodiments, an interface system (not shown) implementing a load balancing function (e.g., an F5 Big-IP load balancer) is located between the application servers 2122 and the user systems 2150 and is configured to distribute requests to the application servers 2122. In some embodiments, the load balancer uses a least connections algorithm to route user requests to the application servers 2122. Other examples of load balancing algorithms, such as are round robin and observed response time, also can be used. For example, in certain embodiments, three consecutive requests from the same user could hit three different servers 2122, and three requests from different users could hit the same server 2122.

In some embodiments, MTS 2100 provides security mechanisms, such as encryption, to keep each tenant's data separate unless the data is shared. If more than one server 2114 or 2122 is used, they may be located in close proximity to one another (e.g., in a server farm located in a single building or campus), or they may be distributed at locations remote from one another (e.g., one or more servers 2114 located in city A and one or more servers 2122 located in city B). Accordingly, MTS 2100 may include one or more logically and/or physically connected servers distributed locally or across one or more geographic locations.

One or more users (e.g., via user systems 2150) may interact with MTS 2100 via network 2140. User system 2150 may correspond to, for example, a tenant of MTS 2100, a provider (e.g., an administrator) of MTS 2100, or a third party. Each user system 2150 may be a desktop personal computer, workstation, laptop, PDA, cell phone, or any Wireless Access Protocol (WAP) enabled device or any other computing device capable of interfacing directly or indirectly to the Internet or other network connection. User system 2150 may include dedicated hardware configured to interface with MTS 2100 over network 2140. User system 2150 may execute a graphical user interface (GUI) corresponding to MTS 2100, an HTTP client (e.g., a browsing program, such as Microsoft's Internet Explorer™ browser, Netscape's Navigator™ browser, Opera's browser, or a WAP-enabled browser in the case of a cell phone, PDA or other wireless device, or the like), or both, allowing a user (e.g., subscriber of a CRM system) of user system 2150 to access, process, and view information and pages available to it from MTS 2100 over network 2140. Each user system 2150 may include one or more user interface devices, such as a keyboard, a mouse, touch screen, pen or the like, for interacting with a graphical user interface (GUI) provided by the browser on a display monitor screen, LCD display, etc. in conjunction with pages, forms and other information provided by MTS 2100 or other systems or servers. As discussed above, disclosed embodiments are suitable for use with the Internet, which refers to a specific global internetwork of networks. It should be understood, however, that other networks may be used instead of the Internet, such as an intranet, an extranet, a virtual private network (VPN), a non-TCP/IP based network, any LAN or WAN or the like.

Because the users of user systems 2150 may be users in differing capacities, the capacity of a particular user system 2150 might be determined one or more permission levels associated with the current user. For example, when a salesperson is using a particular user system 2150 to interact with MTS 2100, that user system 2150 may have capacities (e.g., user privileges) allotted to that salesperson. But when an administrator is using the same user system 2150 to interact with MTS 2100, the user system 2150 may have capacities (e.g., administrative privileges) allotted to that administrator. In systems with a hierarchical role model, users at one permission level may have access to applications, data, and database information accessible by a lower permission level user, but may not have access to certain applications, database information, and data accessible by a user at a higher permission level. Thus, different users may have different capabilities with regard to accessing and modifying application and database information, depending on a user's security or permission level. There may also be some data structures managed by MTS 2100 that are allocated at the tenant level while other data structures are managed at the user level.

In some embodiments, a user system 2150 and its components are configurable using applications, such as a browser, that include computer code executable on one or more processing elements. Similarly, in some embodiments, MTS 2100 (and additional instances of MTSs, where more than one is present) and their components are operator configurable using application(s) that include computer code executable on processing elements. Thus, various operations described herein may be performed by executing program instructions stored on a non-transitory computer-readable medium and executed by processing elements. The program instructions may be stored on a non-volatile medium such as a hard disk, or may be stored in any other volatile or non-volatile memory medium or device as is well known, such as a ROM or RAM, or provided on any media capable of staring program code, such as a compact disk (CD) medium, digital versatile disk (DVD) medium, a floppy disk, and the like. Additionally, the entire program code, or portions thereof, may be transmitted and downloaded from a software source, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing aspects of the disclosed embodiments can be implemented in any programming language that can be executed on a server or server system such as, for example, in C, C+, HTML, Java, JavaScript, or any other scripting language, such as VBScript.

Network 2140 may be a LAN (local area network), WAN (wide area network), wireless network, point-to-point network, star network, token ring network, hub network, or any other appropriate configuration. The global internetwork of networks, often referred to as the "Internet" with a capital "I," is one example of a TCP/IP (Transfer Control Protocol and Internet Protocol) network. It should be understood, however, that the disclosed embodiments may utilize any of various other types of networks.

User systems 2150 may communicate with MTS 2100 using TCP/IP and, at a higher network level, use other common Internet protocols to communicate, such as HTTP, FTP, AFS, WAP, etc. For example, where HTTP is used, user system 2150 might include an HTTP client commonly referred to as a "browser" for sending and receiving HTTP messages from an HTTP server at MTS 2100. Such a server might be implemented as the sole network interface between MTS 2100 and network 2140, but other techniques might be used as well or instead. In some implementations, the interface between MTS 2100 and network 2140 includes load sharing functionality, such as round-robin HTTP request distributors to balance loads and distribute incoming HTTP requests evenly over a plurality of servers.

In various embodiments, user systems 2150 communicate with application servers 2122 to request and update system-level and tenant-level data from MTS 2100 that may require one or more queries to data storage 2112. In some embodiments, MTS 2100 automatically generates one or more SQL statements (the SQL query) designed to access the desired information. In some cases, user systems 2150 may generate requests having a specific format corresponding to at least a portion of MTS 2100. As an example, user systems 2150 may request to move data objects into a particular environment using an object notation that describes an object relationship mapping (e.g., a JavaScript object notation mapping) of the specified plurality of objects.

Exemplary Computer System

Figure 22:
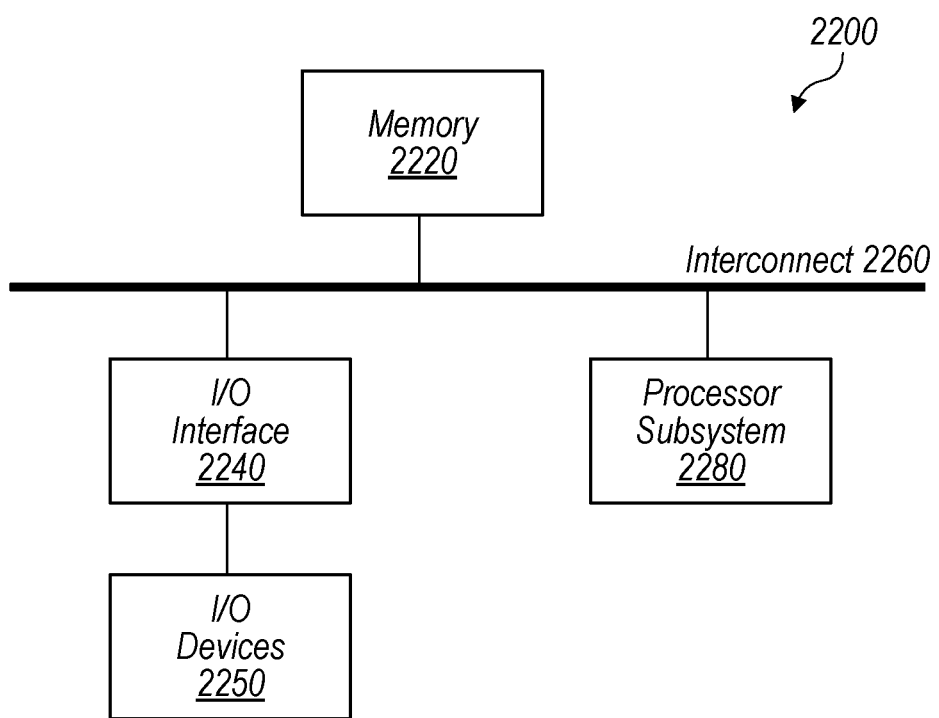
FIG. 22 is a block diagram illustrating elements of a computer system for implementing various systems described in the present disclosure, according to some embodiments.

Turning now to FIG. 22, a block diagram of an exemplary computer system 2200, which may implement system 100, database 110, a worker node 120, a director node 135, an assistant node 1030, MTS 2100, and/or user system 2150, is depicted. Computer system 2200 includes a processor subsystem 2280 that is coupled to a system memory 2220 and I/O interfaces(s) 2240 via an interconnect 2260 (e.g., a system bus). I/O interface(s) 2240 is coupled to one or more I/O devices 2250. Although a single computer system 2200 is shown in FIG. 22 for convenience, system 2200 may also be implemented as two or more computer systems operating together.

Processor subsystem 2280 may include one or more processors or processing units. In various embodiments of computer system 2200, multiple instances of processor subsystem 2280 may be coupled to interconnect 2260. In various embodiments, processor subsystem 2280 (or each processor unit within 2280) may contain a cache or other form of on-board memory.

System memory 2220 is usable store program instructions executable by processor subsystem 2280 to cause system 2200 perform various operations described herein. System memory 2220 may be implemented using different physical memory media, such as hard disk storage, floppy disk storage, removable disk storage, flash memory, random access memory (RAM—SRAM, EDO RAM, SDRAM, DDR SDRAM, RAMBUS RAM, etc.), read only memory (PROM, EEPROM, etc.), and so on. Memory in computer system 2200 is not limited to primary storage such as memory 2220. Rather, computer system 2200 may also include other forms of storage such as cache memory in processor subsystem 2280 and secondary storage on I/O Devices 2250 (e.g., a hard drive, storage array, etc.). In some embodiments, these other forms of storage may also store program instructions executable by processor subsystem 2280. In some embodiments, program instructions that when executed implement database application 200, in-memory cache 210, and/or orchestration application 300 may be included/stored within system memory 2220.

I/O interfaces 2240 may be any of various types of interfaces configured to couple to and communicate with other devices, according to various embodiments. In one embodiment, I/O interface 2240 is a bridge chip (e.g., Southbridge) from a front-side to one or more back-side buses. I/O interfaces 2240 may be coupled to one or more I/O devices 2250 via one or more corresponding buses or other interfaces. Examples of I/O devices 2250 include storage devices (hard drive, optical drive, removable flash drive, storage array, SAN, or their associated controller), network interface devices (e.g., to a local or wide-area network), or other devices (e.g., graphics, user interface devices, etc.). In one embodiment, computer system 2200 is coupled to a network via a network interface device 2250 (e.g., configured to communicate over WiFi, Bluetooth, Ethernet, etc.).

The present disclosure includes references to "embodiments," which are non-limiting implementations of the disclosed concepts. References to "an embodiment," "one embodiment," "a particular embodiment," "some embodiments," "various embodiments," and the like do not necessarily refer to the same embodiment. A large number of possible embodiments are contemplated, including specific embodiments described in detail, as well as modifications or alternatives that fall within the spirit or scope of the disclosure. Not all embodiments will necessarily manifest any or all of the potential advantages described herein.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" or is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as being "configured to" perform some task refers to something physical, such as a device, circuit, a system having a processor unit and a memory storing program instructions executable to implement the task, etc. This phrase is not used herein to refer to something intangible.

In some cases, various units/circuits/components may be described herein as performing a set of task or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

Different "circuits" may be described in this disclosure. These circuits or "circuitry" constitute hardware that includes various types of circuit elements, such as combinatorial logic, clocked storage devices (e.g., flip-flops, registers, latches, etc.), finite state machines, memory (e.g., random-access memory, embedded dynamic random-access memory), programmable logic arrays, and so on. Circuitry may be custom designed, or taken from standard libraries. In various implementations, circuitry can, as appropriate, include digital components, analog components, or a combination of both. Certain types of circuits may be commonly referred to as "units" (e.g., a decode unit, an arithmetic logic unit (ALU), functional unit, memory management unit (MMU), etc.). Such units also refer to circuits or circuitry.

The disclosed circuits/units/components and other elements illustrated in the drawings and described herein thus include hardware elements such as those described in the preceding paragraph. In many instances, the internal arrangement of hardware elements within a particular circuit may be specified by describing the function of that circuit. For example, a particular "decode unit" may be described as performing the function of "processing an opcode of an instruction and routing that instruction to one or more of a plurality of functional units," which means that the decode unit is "configured to" perform this function. This specification of function is sufficient, to those skilled in the computer arts, to connote a set of possible structures for the circuit.

In various embodiments, as discussed in the preceding paragraph, circuits, units, and other elements may be defined by the functions or operations that they are configured to implement. The arrangement and such circuits/units/components with respect to each other and the manner in which they interact form a microarchitectural definition of the hardware that is ultimately manufactured in an integrated circuit or programmed into an FPGA to form a physical implementation of the microarchitectural definition. Thus, the microarchitectural definition is recognized by those of skill in the art as structure from which many physical implementations may be derived, all of which fall into the broader structure described by the microarchitectural definition. That is, a skilled artisan presented with the microarchitectural definition supplied in accordance with this disclosure may, without undue experimentation and with the application of ordinary skill, implement the structure by coding the description of the circuits/units/components in a hardware description language (HDL) such as Verilog or VHDL. The HDL description is often expressed in a fashion that may appear to be functional. But to those of skill in the art in this field, this HDL description is the manner that is used transform the structure of a circuit, unit, or component to the next level of implementational detail. Such an HDL description may take the form of behavioral code (which is typically not synthesizable), register transfer language (RTL) code (which, in contrast to behavioral code, is typically synthesizable), or structural code (e.g., a netlist specifying logic gates and their connectivity). The HDL description may subsequently be synthesized against a library of cells designed for a given integrated circuit fabrication technology, and may be modified for timing, power, and other reasons to result in a final design database that is transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and other circuit elements (e.g. passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments. Alternatively, the HDL design may be synthesized to a programmable logic array such as a field programmable gate array (FPGA) and may be implemented in the FPGA. This decoupling between the design of a group of circuits and the subsequent low-level implementation of these circuits commonly results in the scenario in which the circuit or logic designer never specifies a particular set of structures for the low-level implementation beyond a description of what the circuit is configured to do, as this process is performed at a different stage of the circuit implementation process.

The fact that many different low-level combinations of circuit elements may be used to implement the same specification of a circuit results in a large number of equivalent structures for that circuit. As noted, these low-level circuit implementations may vary according to changes in the fabrication technology, the foundry selected to manufacture the integrated circuit, the library of cells provided for a particular project, etc. In many cases, the choices made by different design tools or methodologies to produce these different implementations may be arbitrary.

Moreover, it is common for a single implementation of a particular functional specification of a circuit to include, for a given embodiment, a large number of devices (e.g., millions of transistors). Accordingly, the sheer volume of this information makes it impractical to provide a full recitation of the low-level structure used to implement a single embodiment, let alone the vast array of equivalent possible implementations. For this reason, the present disclosure describes structure of circuits using the functional shorthand commonly employed in the industry.

What is claimed is:

1. A method, comprising:
   receiving, by a worker node of a database system, a request to perform a transaction that involves writing a record, wherein the database system includes a plurality of worker nodes operable to perform transactions for the database system and a plurality of director nodes operable to ensure transactional consistency for the transactions;
   selecting, by the worker node, a proposed commit time for the transaction; and
   issuing, by the worker node to director nodes of the plurality of director nodes, a request for approval to commit the transaction, wherein the request specifies the proposed commit time, and wherein a given director node of the director nodes is operable to process the request for approval upon reaching the proposed commit time according to a clock of the given director node that identifies a time observed by the given director node.

2. The method of claim 1, further comprising:
   determining, by the worker node, time delays in communicating with the director nodes, wherein a given time delay of the time delays is a delay between sending a given request from the worker node to a director node of the director nodes and the director node receiving the given request, and wherein the proposed commit time is selected based on the determined time delays.

3. The method of claim 2, further comprising:
   recording a first time at which the given request is sent to the director node; and
   receiving a response to the given request that identifies a second time at which the given request was received at the director node, wherein the given time delay is determined based on the first and second times and a clock-skew.

4. The method of claim 2, wherein the proposed commit time is a future time selected, based on the time delays, to allow the request for approval to arrive at the director nodes before the future time according to respective clocks of the director nodes.

5. The method of claim 1, further comprising:
receiving, by the worker node from at least one of the director nodes, a disapproval response that indicates a disapproval of the proposed commit time based on an arrival of the request at the at least one director node after the proposed commit time according to a clock of the at least one director node.

6. The method of claim 5, wherein the proposed commit time is a first amount of time after a current time that is identified by a clock of the worker node, and wherein the method further comprises:
based on receiving the disapproval response, the worker node selecting another proposed commit time that is a second amount of time after the current time identified by the clock of the worker node, wherein the second amount of time is greater than the first amount of time.

7. The method of claim 1, wherein the proposed commit time is selected based on time identified by a clock of the worker node, and wherein the clock of the worker node identifies a different time than a clock of at least one of the plurality of director nodes.

8. The method of claim 1, wherein a clock of a particular one of the plurality of director nodes specifies a different time than a clock of at least one other director node of the plurality of director nodes.

9. The method of claim 1, wherein the given director node is operable to check for conflicts between the record of the transaction and a set of approved records known to the given director node that occurred before the proposed commit time.

10. A non-transitory computer readable medium having program instructions stored thereon that are capable of causing a worker node of a database system to perform operations comprising:
receiving a request to perform a transaction that involves writing a record, wherein the database system includes a plurality of worker nodes operable to perform transactions for the database system and a plurality of director nodes operable to ensure transactional consistency for the transactions;
selecting a proposed commit time for the transaction; and
issuing, to director nodes of the plurality of director nodes, a request for approval to commit the transaction, wherein the request specifies the proposed commit time, and wherein a given director node of the director nodes is operable to process the request for approval upon reaching the proposed commit time according to a clock of the given director node that identifies a time observed by the given director node.

11. The medium of claim 10, wherein the operations further comprise:
maintaining delay information that identifies time delays between sending a given request to the director nodes and the director nodes receiving the given request, wherein the selecting of the proposed commit time is based on the time delays.

12. The medium of claim 11, wherein the operations further comprise:
recording a first time at which the request for approval was issued to the given director node according to a clock of the worker node;
receiving, from the given director node, a response to the request for approval that identifies a second time at which the request for approval was received at the given director node according to the clock of the given director node; and
updating the delay information to include a time delay based on the first and second times.

13. The medium of claim 12, wherein the operations further comprise:
including the delay information in the request for approval to enable a first director node of the director nodes to attempt to align a time observed by the first director node with a time observed by a second director node of the director nodes.

14. The medium of claim 10, wherein the operations further comprise:
aborting the transaction in response to receiving, from at least one of the director nodes, a disapproval response that indicates a disapproval of the proposed commit time based on an arrival of the request at the at least one director node after the proposed commit time.

15. A method, comprising:
accessing, by a worker node of a database system, delay information specifying time delays in communicating with ones of a plurality of director nodes of the database system that are operable to ensure transactional consistency for transactions of the database system;
receiving, by the worker node, a request to perform a transaction;
selecting, by the worker node, a proposed commit time for the transaction based on the delay information and a clock of the worker node; and
issuing, by the worker node to two or more of the plurality of director nodes, a first request for approval to commit the transaction, wherein the first request specifies the proposed commit time, and wherein a given director node of the two or more director nodes is operable to process the first request for approval upon reaching the proposed commit time according to a clock of the given director node.

16. The method of claim 15, further comprising:
prior to issuing the first request for approval, the worker node issuing a second request to the given director node for approval of a proposed time associated with another transaction;
recording, by the worker node, a first time at which the second request for approval was issued to the given director node according to the clock of the worker node; and
receiving, by the worker node from the given director node, a response to the second request for approval that identifies a second time at which the second request for approval was received at the given director node according to the clock of the given director node, wherein the clock of the worker node identifies a different time than the clock of the given director node, and wherein the proposed commit time is selected based on the first and second times.

17. The method of claim 15, wherein the proposed commit time is a future time that is determined to permit the request for approval to arrive at the given director node prior to the future time according to the clock of the given director node.

18. The method of claim 15, further comprising:
sending, by the worker node, the delay information to the director nodes to enable ones of the director nodes to attempt to align times identified by clocks of the director nodes.

\* \* \* \* \*